United States Patent
Lachine et al.

(10) Patent No.: US 12,020,408 B2
(45) Date of Patent: Jun. 25, 2024

(54) SHARPENING OF IMAGES IN NON-LINEAR AND LINEAR FORMATS

(71) Applicant: ATI Technologies ULC, Markham (CA)

(72) Inventors: Vladimir Lachine, Markham (CA); Keith Lee, Markham (CA)

(73) Assignee: ATI Technologies ULC, Markham (CA)

( * ) Notice: Subject to any disclaimer, the term of this patent is extended or adjusted under 35 U.S.C. 154(b) by 115 days.

(21) Appl. No.: 17/354,856

(22) Filed: Jun. 22, 2021

(65) Prior Publication Data

US 2022/0405889 A1 Dec. 22, 2022

(51) Int. Cl.
*G06T 5/73* (2024.01)
*G06T 5/20* (2006.01)
*G06T 5/50* (2006.01)
*G06T 5/70* (2024.01)

(52) U.S. Cl.
CPC .................. *G06T 5/73* (2024.01); *G06T 5/20* (2013.01); *G06T 5/50* (2013.01); *G06T 5/70* (2024.01); *G06T 2207/10024* (2013.01)

(58) Field of Classification Search
CPC ........... G06T 5/003; G06T 5/002; G06T 5/20; G06T 5/50; G06T 2207/10024; G06T 5/004
See application file for complete search history.

(56) References Cited

U.S. PATENT DOCUMENTS

| | | | |
|---|---|---|---|
| 5,081,692 A | 1/1992 | Kwon et al. | |
| 7,228,004 B2 | 6/2007 | Gallagher et al. | |
| 7,373,011 B2* | 5/2008 | Saquib | H04N 1/4092 382/255 |
| 7,561,186 B2* | 7/2009 | Poon | G06T 5/75 348/208.99 |
| 8,351,725 B2 | 1/2013 | Pan et al. | |
| 10,529,060 B2* | 1/2020 | Kwon | H04N 5/33 |
| 11,216,912 B2* | 1/2022 | Veit | G06T 5/70 |
| 2003/0189579 A1 | 10/2003 | Pope | |
| 2006/0083438 A1* | 4/2006 | Donomae | G06T 5/73 382/254 |
| 2011/0150332 A1 | 6/2011 | Sibiryakov et al. | |
| 2018/0220162 A1* | 8/2018 | Sychev | H04N 19/51 |

* cited by examiner

*Primary Examiner* — Edward F Urban
*Assistant Examiner* — Benedict E Lee
(74) *Attorney, Agent, or Firm* — Kowert, Hood, Munyon, Rankin & Goetzel, P.C.; Rory D. Rankin

(57) ABSTRACT

Systems, apparatuses, and methods for performing optimized sharpening of images in non-linear and linear formats are disclosed. A system includes a blur filter and a sharpener. The blur filter receives an input image or video frame and provides blurred output pixels to a sharpener unit. The sharpener unit operates in linear or non-linear space depending on the format of the input frame. The sharpener unit includes one or more optimizations to generate sharpened pixel data in an area-efficient manner. The sharpened pixel data is then driven to a display.

18 Claims, 23 Drawing Sheets

SHARPENING OF IMAGES IN NON-LINEAR AND LINEAR FORMATS

BACKGROUND

Description of the Related Art

Images and video frames undergo various stages of processing within an image, graphics, or video processing pipeline. Up-scaled images, especially those images up-scaled by large scale factors, may look blurred and may need post-sharpening. Down-scaling may not require sharpening processing as the sharpness can be controlled by the frequency response of the interpolation filter. Images that have not been resampled can still benefit from the processing performed by a sharpener.

When undergoing sharpening, the image and video frames can be encoded in different color spaces, with red, green, and blue (RGB) and luma-chroma (Y'C'bC'r) two of the more common color spaces. Also, the image/video frame can be encoded in linear or non-linear space, which can impact how the image/video frame is processed. In some cases, an image is referred to as being perceptual quantization (PQ) encoded, which means the image is in non-linear space. As used herein, the prime (') symbol indicates that the image/video frame is in non-linear space. For example, a Y'C'bC'r notation indicates that the image is in non-linear space. Similarly, a RGB notation means that the image is in linear space while a R'G'B' notation indicates that the image is in non-linear space. It is noted that when an image is described as being "gamma/PQ encoded" or having "gamma/PQ encoding", this implies that the image is in non-linear space.

In some cases, the sharpness of an image can be adjusted using unsharp masking, which is a sharpening algorithm that is known in the prior art. The unsharp masking sharpening algorithm involves convolving an input digital image with a blur filter to produce a blurred image. The blurred image is then subtracted from the input image to generate an edge image. The edge image is then added back to the original image so as to generate the sharpened image. The amount of processing involved in performing sharpening and other steps can have a significant impact on power consumption, as well as affecting the area and memory requirements of the resultant circuitry. Accordingly, techniques for improving the efficiency of image and video frame processing are desired.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for implementing optimized sharpening of images in non-linear and linear formats are disclosed herein. The proposed optimized sharpening may be applied for up-scaled, down-scaled, and un-scaled images. In one implementation, an image encoded in the non-linear gamma encoded Y'C'bC'r format is received by an optimized sharpener mechanism. In this implementation, the difference between the luma component and the blurred luma component is tuned by a delta shaping function and by a sharpening gain adjustment function of the blurred luma component. The tuning functions control sharpness and minimize artifacts and noise boosting. Finally, the tuned luma difference component is added to the luma component.

In another implementation, an image, encoded in non-linear gamma or perceptual quantization (PQ) encoded R'G'B' format, is received by an optimized sharpener mechanism. In this implementation, a luma difference component is tuned by a delta shaping function and by a sharpening gain adjustment function of the blurred luma component, and then the resultant tuned luma difference component is added to the R'G'B' image components. For sharpening of images in a linear RGB format, the luminance difference component is converted into human perception uniform non-linear space using a re-gamma derivative function in one implementation. The result of the conversion is referred to as the luma difference component. Then, after tuning, the tuned luma difference component is converted back to linear space using a reciprocal re-gamma derivative function. Finally, the resultant tuned luminance difference component is added back to the RGB image components.

Figure 1:
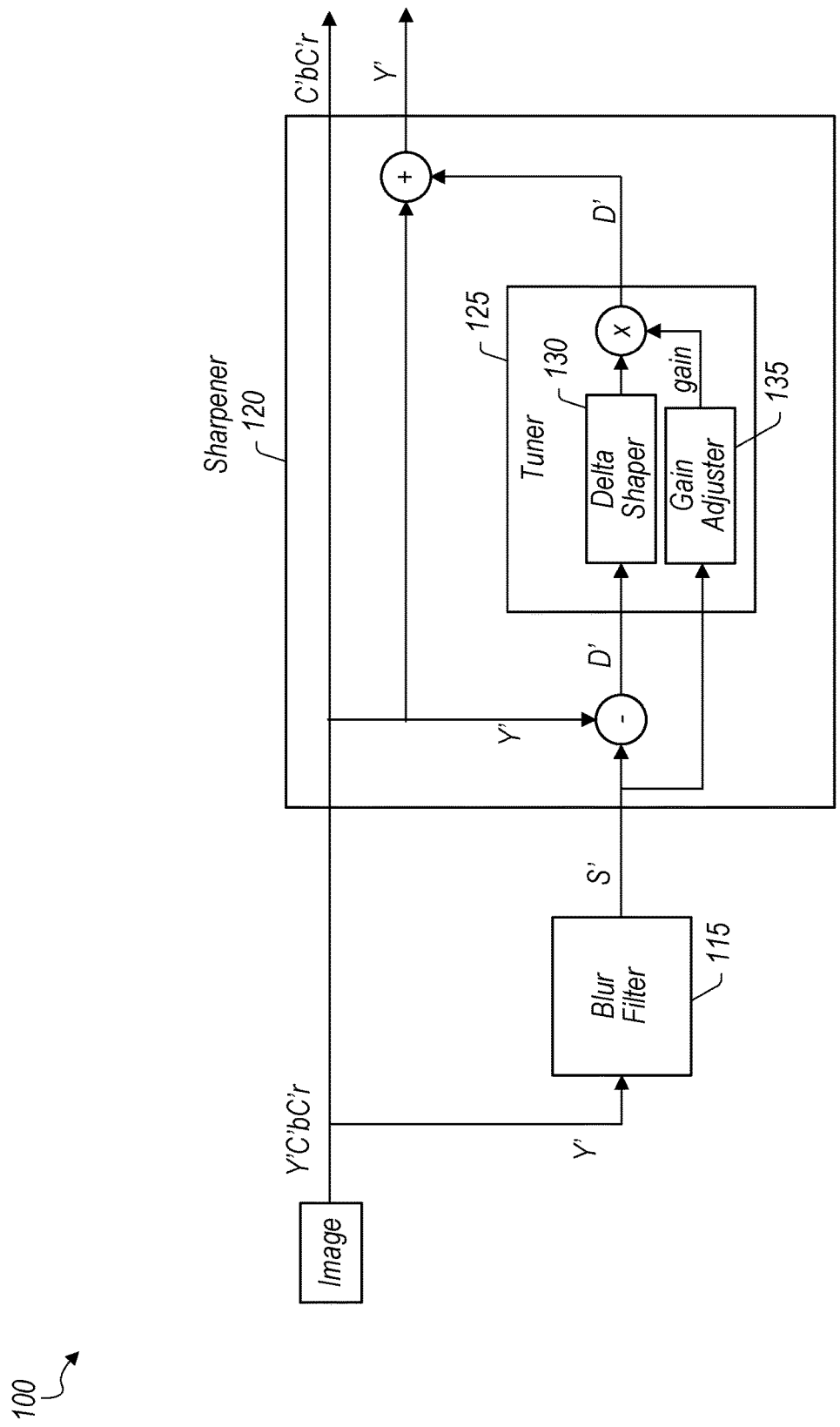
FIG. 1 is a block diagram of one implementation of an optimized sharpener mechanism.

Referring now to FIG. 1, a block diagram of one implementation of an optimized sharpener mechanism 100. In one implementation, optimized sharpener mechanism 100 receives an input image in a non-linear gamma encoded Y'C'bC'r format. In the cases when the input image is formatted in a non-linear gamma or perceptual quantizer (PQ) encoded R'G'B' format or linear RGB format, the input image can be converted to Y'C'bC'r format before sharpening and converted back to the original format afterward.

In one implementation, blur filter 115 performs a blurring operation on the input pixel data to generate blurred luma component S'. Sharpener 120 sharpens the difference component D', with difference component D' calculated as the difference between original luma component Y' and blurred luma component S'. It is noted that sharpener 120 can be implemented using any suitable combination of circuitry, processing elements/units, and/or program instructions. For sharpening of an image in non-linear gamma encoded Y'C'bC'r format, the C'b component and the C'r component of the image are passed through unchanged while the luma difference D'=Y'-S' between the luma Y' and blurred luma S' is tuned and added back to the luma Y'. It is noted that the terms "blur" and "blurred" may be used interchangeably herein.

In one implementation, blur filter 115 is implemented as separable two-stage one-dimensional (1D) interpolation filters. This implementation can be a horizontal filter followed by a vertical filter, or a vertical filter followed by a horizontal filter. In another implementation, blur filter 115 is implemented as a non-separable one stage two-dimensional (2D) interpolation filter. In the separable case, sharpening is applied after both the horizontal and vertical stages. The coefficients of blur filter 115 can be programmable or hard-coded, depending on the implementation.

As shown in FIG. 1, the difference D' between the luma output Y' and the blurred luma output S' of blur filter 115 is calculated and then provided to delta shaper 130 of tuner 125. In one implementation, delta shaper 130 is a delta tuning circuit for adjusting the luma delta D' to control quality of the response. In one implementation, visual quality of the sharpened image is controlled by the delta shaping tuning function of luma delta D' itself and by the gain adjustment tuning function of the local brightness estimate S' of gain adjust unit 135.

Figure 2:
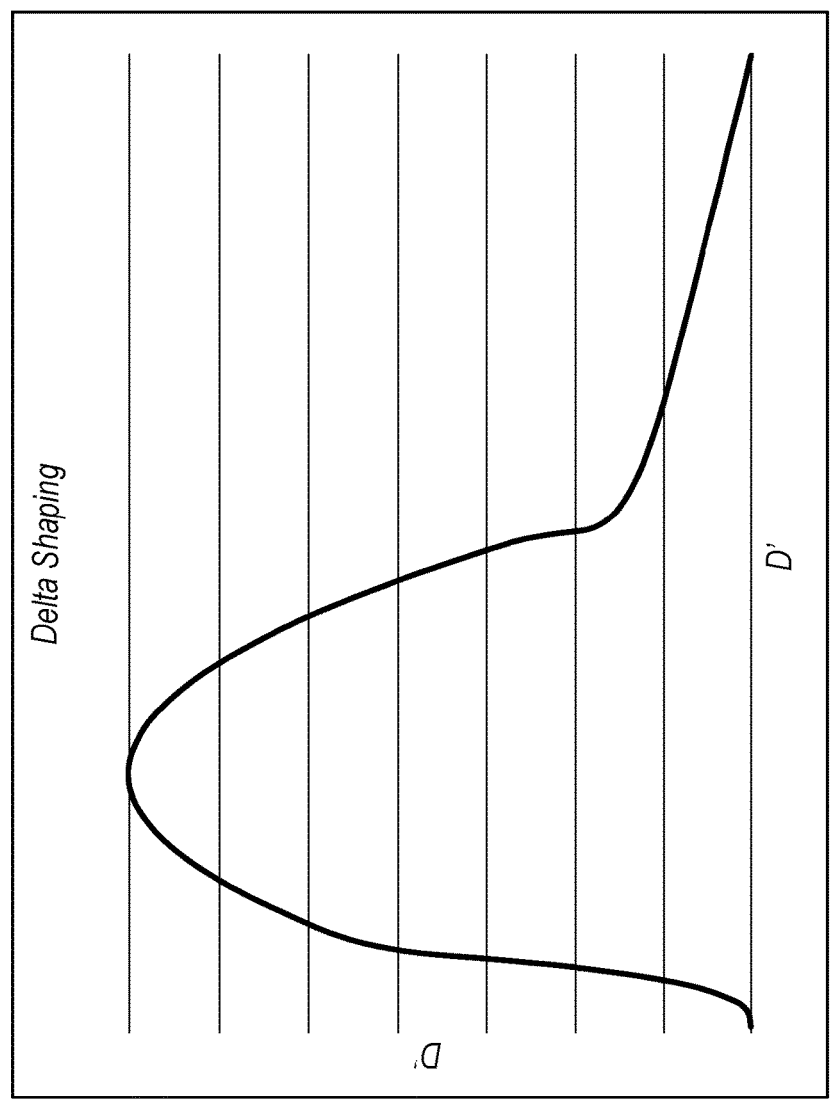
FIG. 2 is a tuning function graph of a delta shaper.
Figure 3:
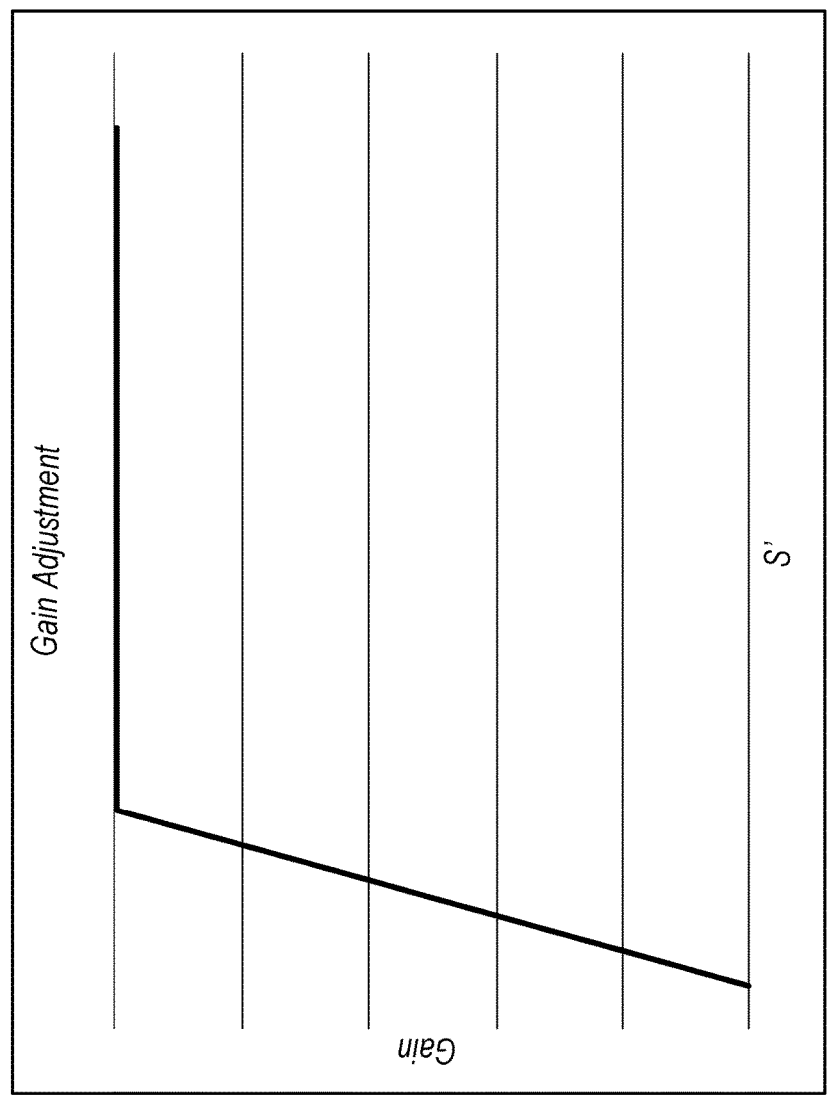
FIG. 3 is a tuning function graph of a gain adjuster.

One example of a tuning function which can be employed for delta shaper 130 is shown as tuning function graph 200 of FIG. 2. In one implementation, the input luma delta D' in tuning function graph 200 varies in a range of [0.0, 0.25] for a signal dynamic range of [0.0, 1.0]. In other implementations, other types of tuning functions can be employed for delta shaper 130. The blurred luma output S' of blur filter 115 is provided to gain adjuster 135. In one implementation, the strength of sharpening may be further controlled by the gain parameter provided by gain adjuster 135. One example of a tuning function which can be employed for gain adjuster 135 is shown as tuning function graph 300 of FIG. 3. In one implementation, the input blur luma S' in tuning function graph 300 varies for a full signal dynamic range of [0.0, 1.0]. In other implementations, other types of tuning functions can be employed for gain adjuster 135.

In one implementation, the tuning functions employed by delta shaper 130 and gain adjuster 135 are approximated by piece-wise linear tables. The outputs of delta shaper 130 and gain adjust 135 are multiplied together and then added to the luma to generate the sharpened luma output of optimized sharpener mechanism 100. The chrominance components are passed through to the output of optimized sharpener mechanism 100.

Figure 4:
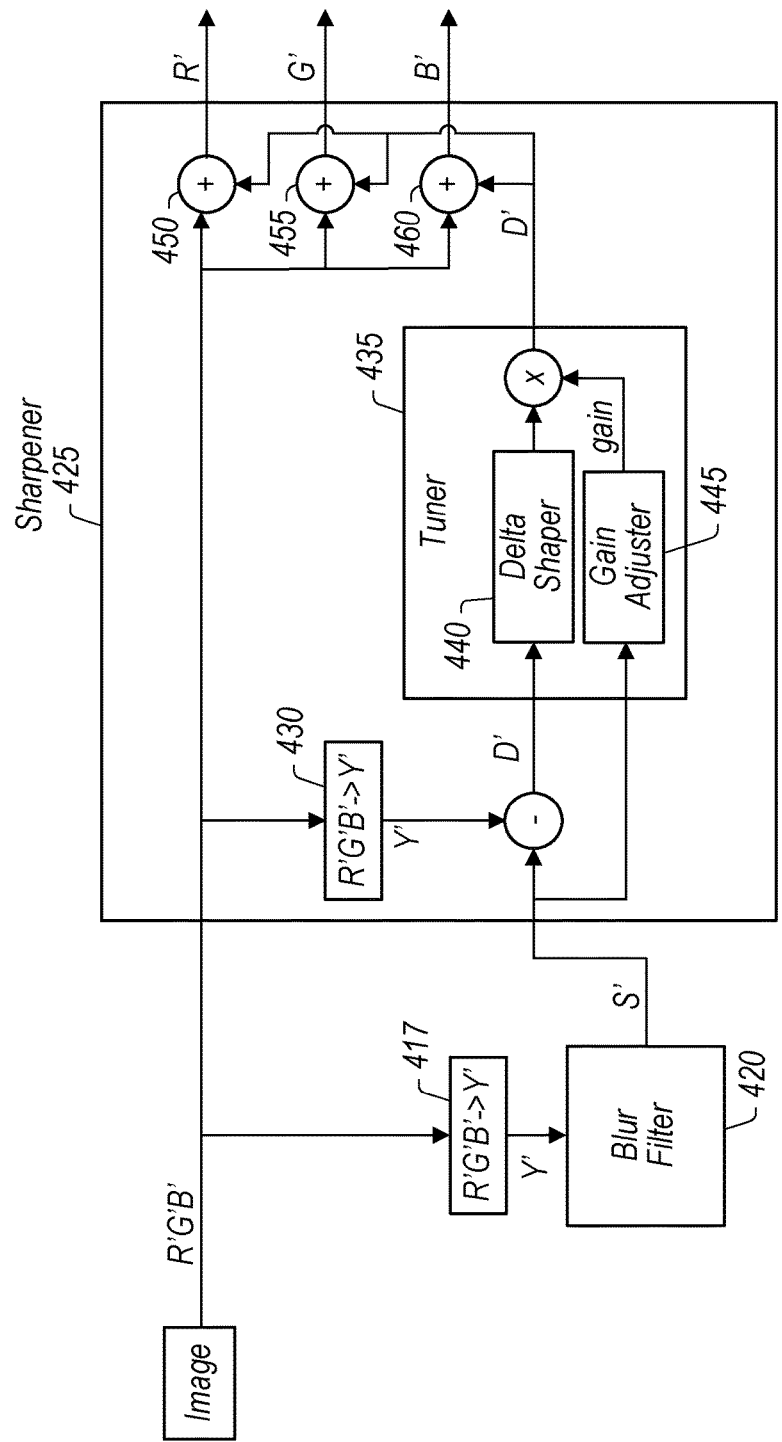
FIG. 4 is a block diagram of one implementation of an optimized sharpener mechanism.

Turning now to FIG. 4, a block diagram of one implementation of an optimized sharpener mechanism 400 is shown. In one implementation, optimized sharpener 400 is used for sharpening of images in non-linear gamma or PQ encoded R'G'B' format. It is noted that optimized sharpener 400 can also be referred to as optimized sharpener unit 400. The input pixel data in non-linear gamma or PQ encoded R'G'B' format is received by blur filter 420.

In one implementation, R'G'B'-to-Y' converter 417 generates the luma component Y' from the R', G', and B' components of the input pixel data. The luma component Y' output from R'G'B'-to-Y' converter 417 is provided to blur filter 420. R'G'B'-to-Y' converter 430 generates the luma component Y' from the R', G', and B' components. The luma delta D' provided to tuner 435 is generated as the difference between the luma component Y' generated by R'G'B'-to-Y' converter 430 and the blur luma S' output of blur filter 420. In one implementation, tuner 435 tunes the luma delta D' with delta shaper 440 and with gain adjuster 445 as a function of the blur luma component S'. In other implementations, tuner 435 can use other techniques to tune the luma delta D' so as to generate the tuned luma delta D' output. In one implementation, the same tuned luma delta D' output of tuner 435 is added to all three R'G'B' components of the image as follows: R'=R'+D', G'=G'+D', B'=B'+D'. For these equations, D'=DeltaShaper(D')*GainAdjuster(S').

In a traditional approach, each R'G'B' component would be multiplied by a factor of (Y'+D')/Y' to avoid hue shifts. However, in the approach shown in FIG. 4, instead of using multiplication, the tuned luma delta D' output of tuner 435 is added to the R'G'B' components to save hardware gates. In terms of quality, the potential hue shift is masked by the Human Visual System. In one implementation, the luma delta component D' is adjusted by two tuning functions to be mild enough to avoid visually perceivable hue shift artifacts.

Figure 5:
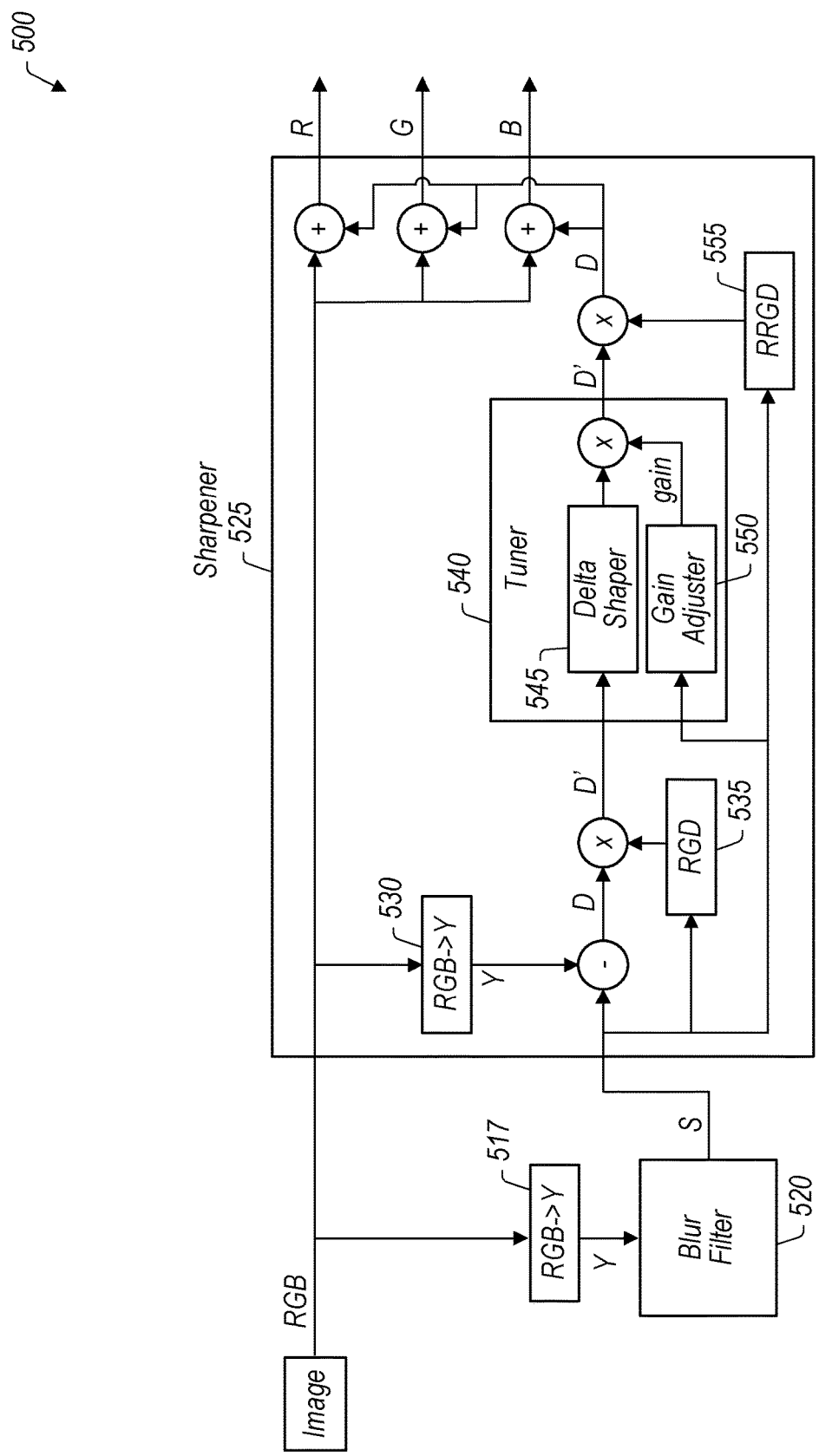
FIG. 5 is a block diagram of one implementation of an optimized sharpener mechanism for linear RGB pixel data.

Referring now to FIG. 5, a block diagram of one implementation of an optimized sharpener mechanism 500 for linear RGB pixel data is shown. It is assumed for the purposes of this discussion that the input RGB pixel data is formatted in linear space. The luminance component Y of the input RGB pixel data is computed by RGB-to-Y converter 517 and provided to blur filter 520. In another implementation, the green pixel component can be used as a representation of the luminance component Y rather than having RGB-to-Y converter 517 generate the luminance component Y. Other techniques for generating a representation or approximation of the luminance channel are possible and are contemplated. The RGB values are provided to RGB-to-Y converter 530. Also, the difference between the luminance component output of RGB-to-Y converter 530 and the blurred output S of blur filter 520 is generated. This difference is labeled as "D" within sharpener 525 and is also referred to as the "luminance delta" or the "luminance delta component".

Figure 6:
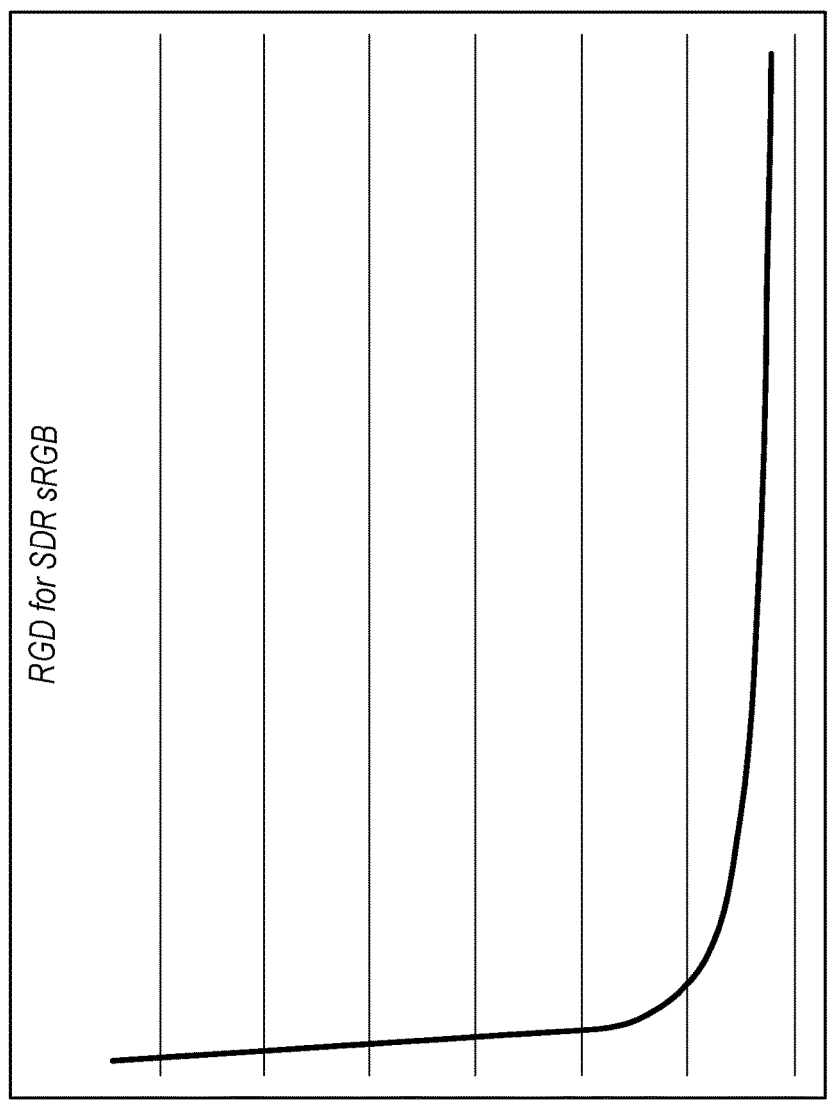
FIG. 6 illustrates a shape of a re-gamma derivative curve for a SDR sRGB encoded image.
Figure 7:
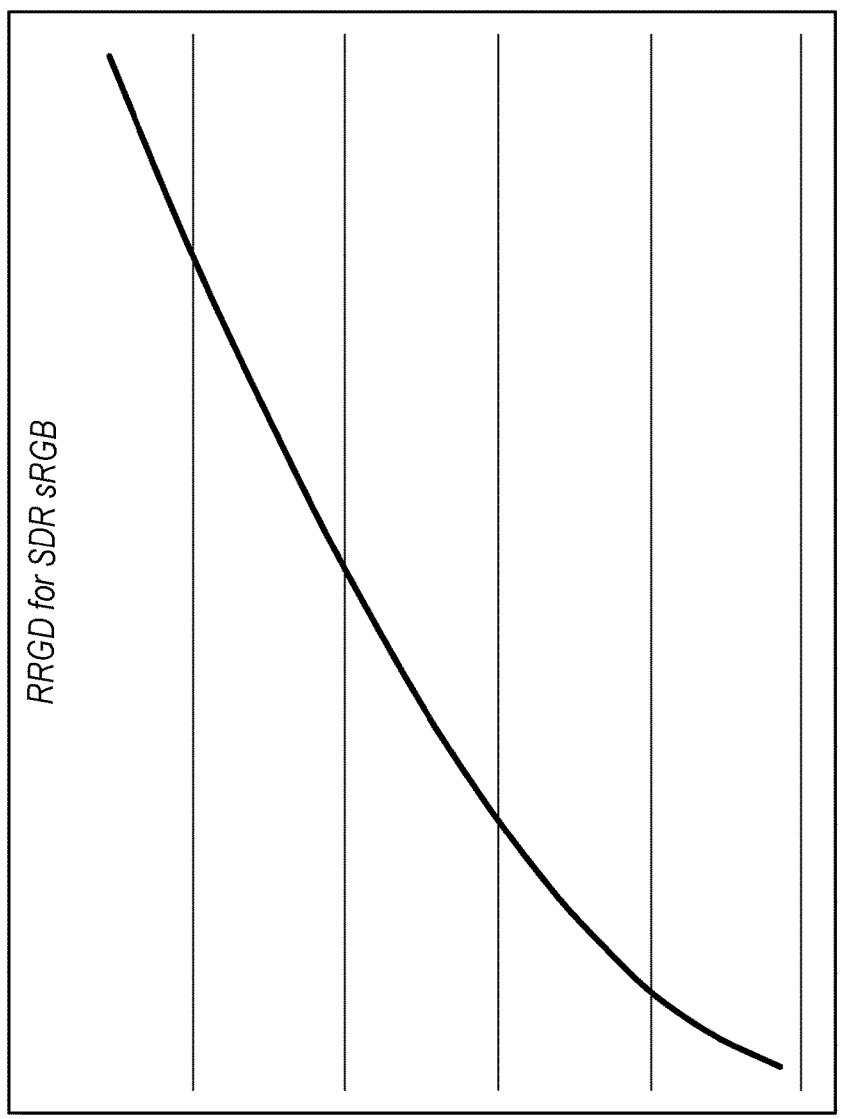
FIG. 7 illustrates a shape of a reciprocal re-gamma derivative curve for a SDR sRGB encoded image.
Figure 8:
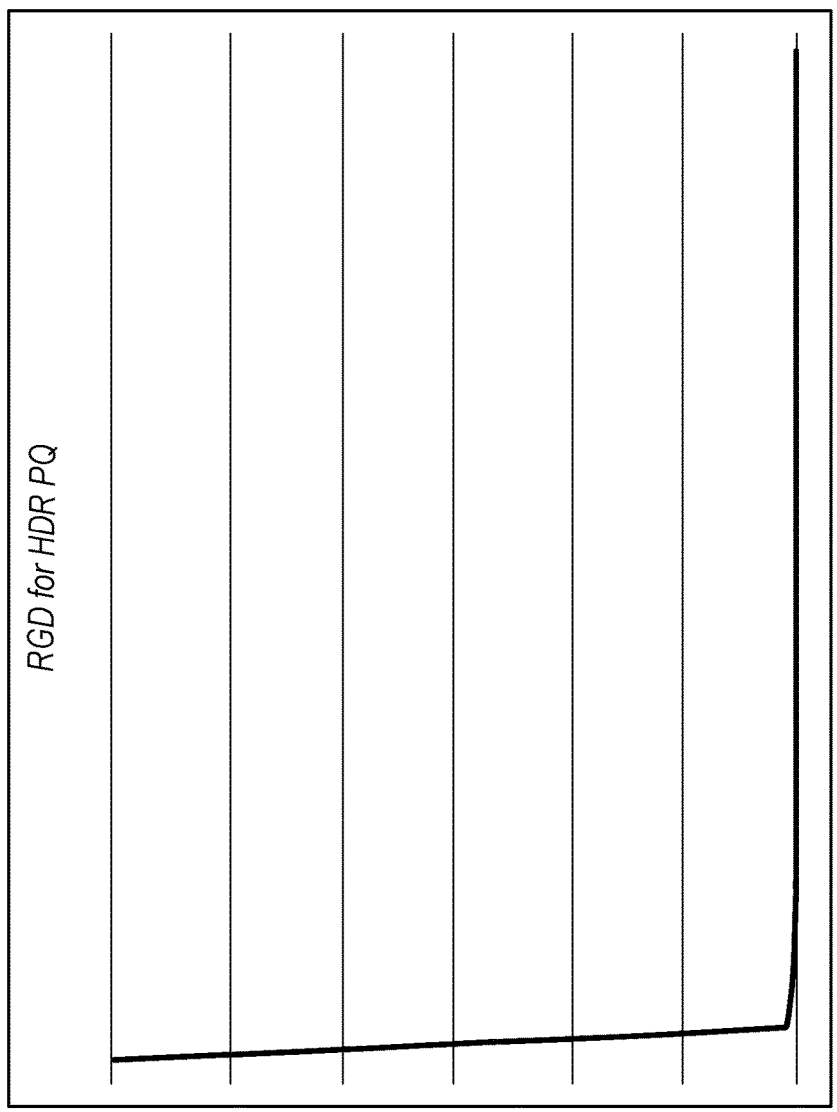
FIG. 8 illustrates a shape of a re-gamma derivative curve for a HDR PQ encoded image.
Figure 9:
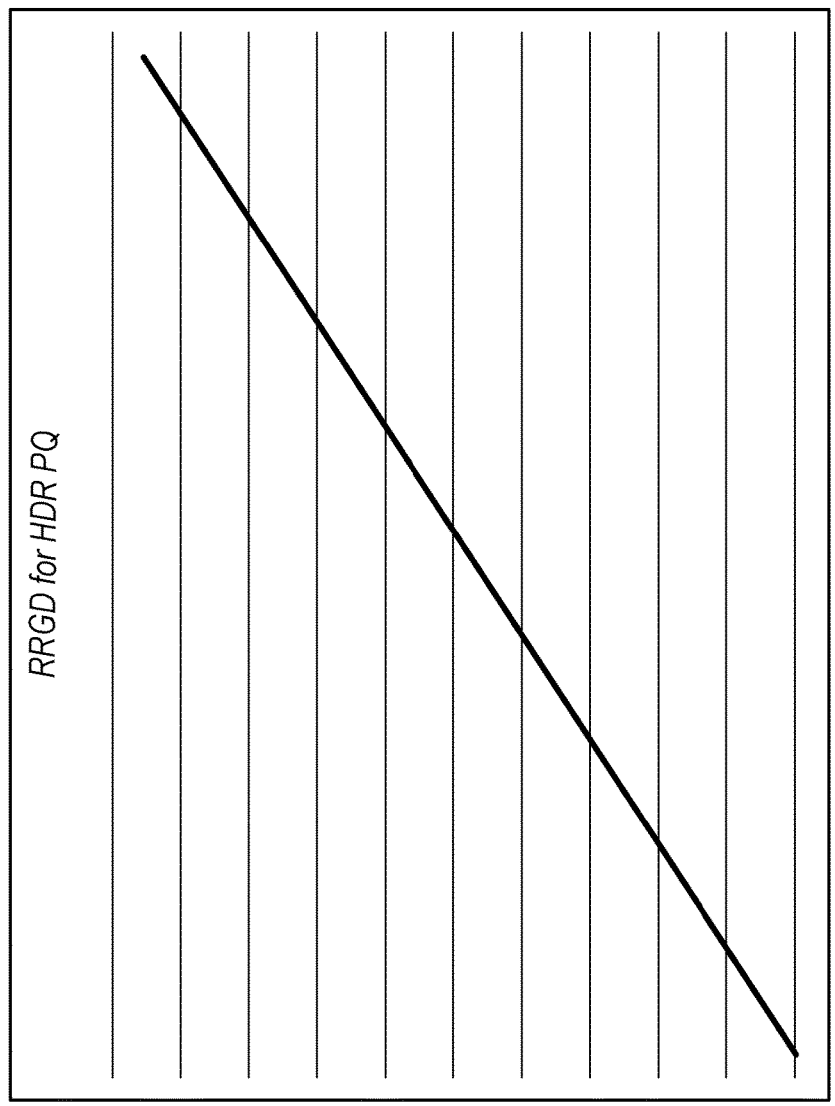
FIG. 9 illustrates a shape of a reciprocal re-gamma derivative curve for a HDR PQ encoded image.

In accordance with the Human Visual System model, to avoid visually annoying artifacts, the luminance delta D is tuned in perception uniform (i.e., non-linear) space. In one implementation, two functions are used to generate correction factors. A correction factor of delta conversion from linear space to non-linear space is generated by function RGD(S), which is represented by RGD block 535. RGD(S) generates a Re-Gamma Derivative factor to transform luminance delta D into luma delta D'. Also, a correction factor of delta conversion from non-linear space to linear space is generated by function RRGD(S), which is represented by RRGD block 555. RRGD(S) generates a Reciprocal Re-Gamma Derivative factor to transform tuned luma delta D' back to tuned luminance delta D. The luma delta D' is tuned by delta shaper 545 of tuner 540 and by gain adjuster 550 of tuner 540. RGD(S) and RRGD(S) functions may be approximated by piece-wise linear tables in one embodiment. The first table may approximate PQ or sRGB Re-Gamma Derivative curves and the second table may approximate PQ or sRGB Reciprocal Re-Gamma Derivative curves depending on Standard Dynamic Range (SDR) or High Dynamic Range (HDR) image encodings. Shapes of the curves 600 and 700 for a SDR sRGB encoded image with signal range [0.0,1.0] are presented in FIG. 6 and FIG. 7, respectively, in accordance with one particular implementation. Shapes of the curves 800 and 900 for a HDR PQ encoded image with signal range [0,10000] nits are presented in FIG. 8 and FIG. 9, respectively, in accordance with one particular implementation.

Figure 10:
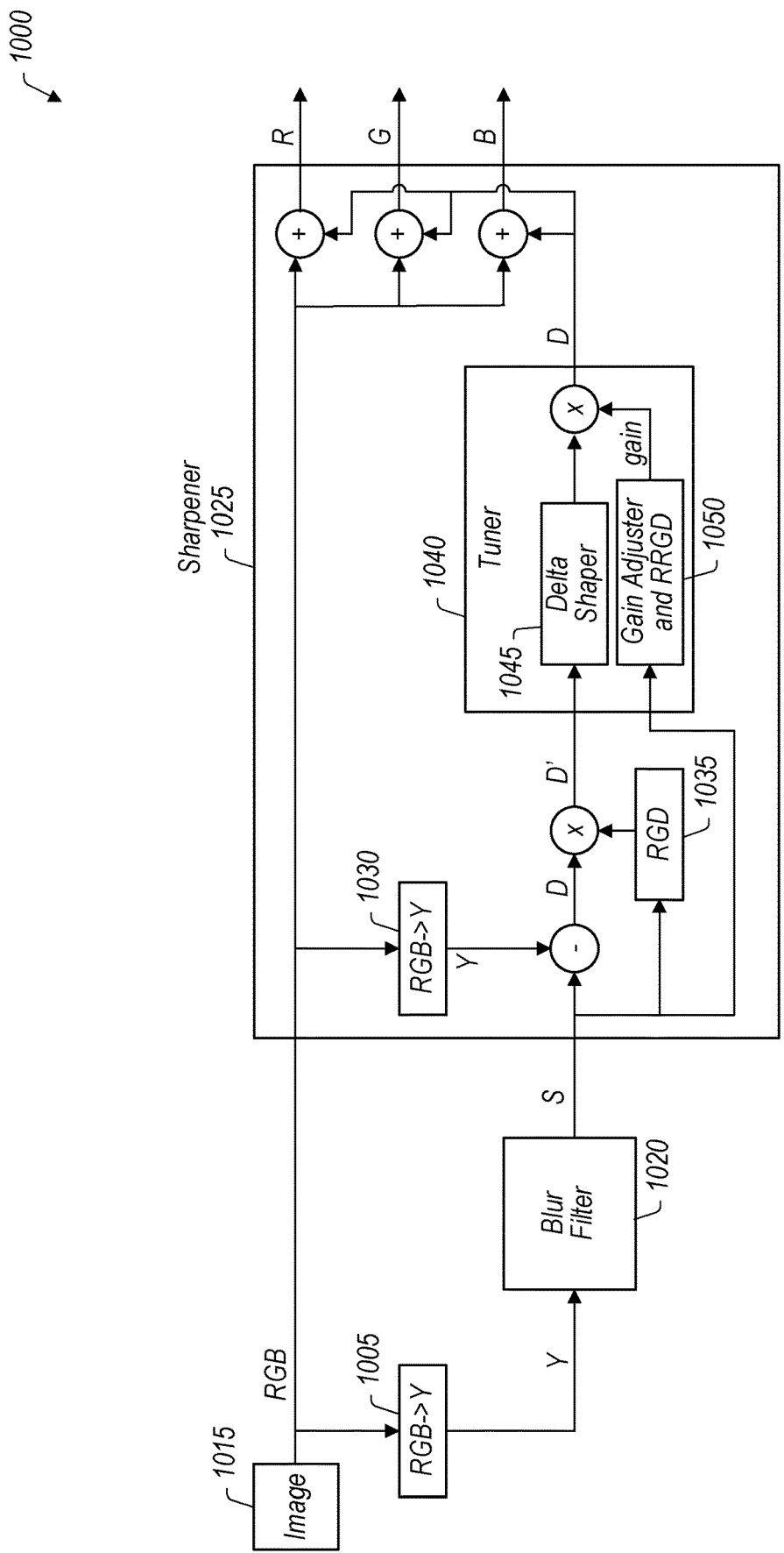
FIG. 10 is a block diagram of one implementation of an optimized sharpener mechanism for linear RGB pixel data.

Turning now to FIG. 10, a block diagram of one implementation of an optimized sharpener mechanism 1000 for linear RGB pixel data is shown. As with the previously described optimized sharpener mechanisms, optimized sharpener mechanism 1000 includes RGB-to-Y converters 1005 and 1030 as well as blur filter 1020. Optimized sharpener mechanism 1000 also includes sharpener 1025, RGD block 1035, and delta shaper 1045 which are similar to the corresponding components of optimized sharpener mechanism 500 (of FIG. 5). However, an enhancement of optimized sharpener mechanism 1000 is the combined gain adjuster and RRGD block 1050 within tuner 1040. By combining the gain adjustment tuning function with the RRGD function, a multiplier can be omitted from optimized sharpener mechanism 1000 as compared to optimized sharpener mechanism 500. For optimized sharpener mechanism 1000, R=R+D, G=G+D, and B=B+D. For these equations, D=DeltaShaper(D*RGD(S))*GainAdjusterAndRRGD(S).

Figure 11:
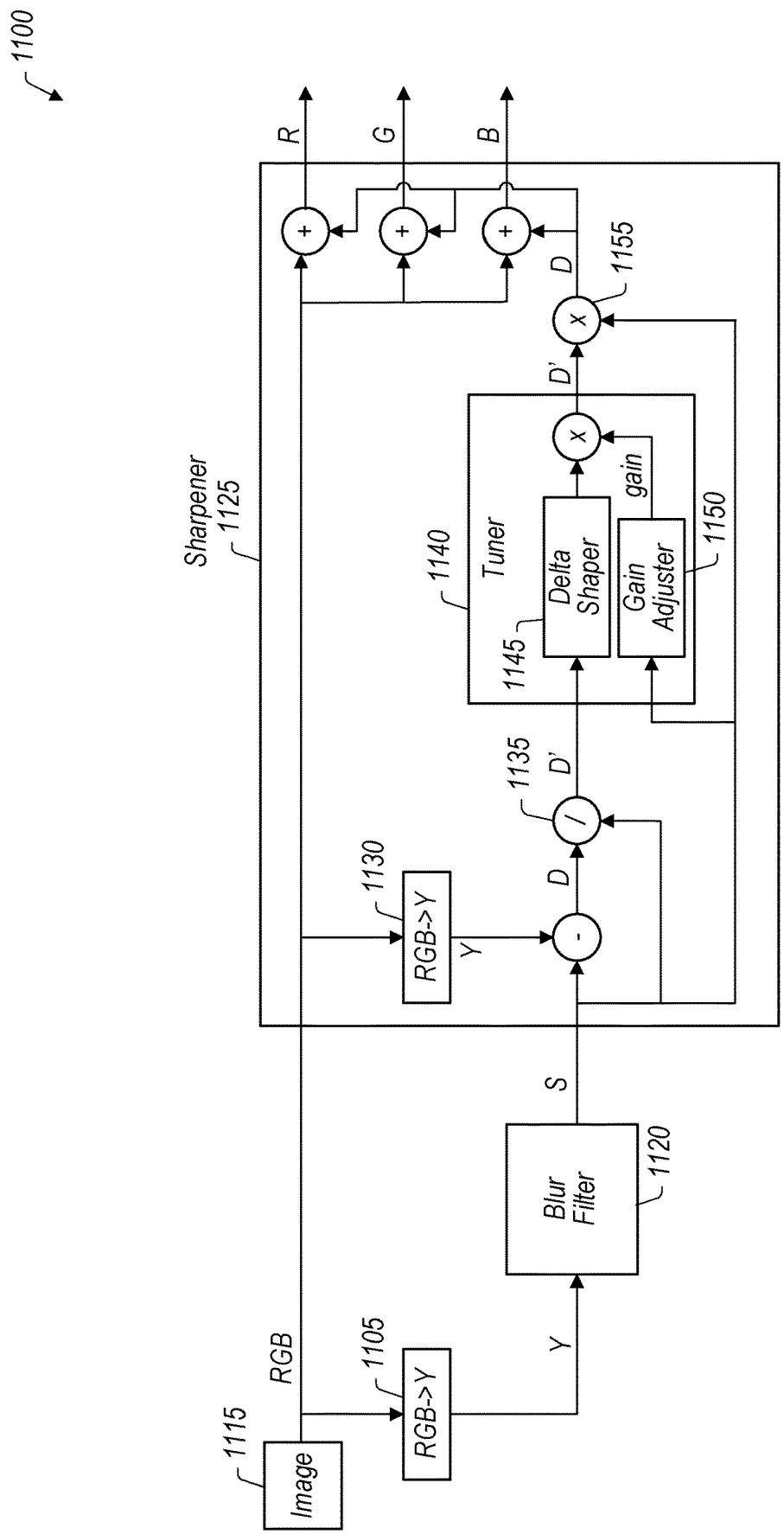
FIG. 11 is a block diagram of one implementation of an optimized sharpener mechanism for linear RGB pixel data.

Referring now to FIG. 11, a block diagram of one implementation of an optimized sharpener mechanism 1100 for linear RGB pixel data is shown. As with previously described optimized sharpener mechanisms, optimized sharpener mechanism 1100 includes RGB-to-Y converters 1105 and 1130 as well as blur filter 1120. Optimized sharpener mechanism 1100 also includes sharpener 1125, tuner 1140, delta shaper 1145, and gain adjuster 1150 which are similar to the corresponding components of optimized sharpener mechanism 500 (of FIG. 5). However, optimized sharpener mechanism 1100 includes an enhancement for performing the transformation of luminance delta D into a non-linear format. As represented by divider component 1135 in FIG. 11, the transformation of luminance delta D in linear space to luma delta D' in non-linear space is achieved by multiplying the luminance delta D by a 1/S factor, where S is the blur luminance component. Also, for transformation back to the linear space, the tuned luma delta D' is multiplied by S, which is the reciprocal value of the 1/S factor. This is represented by multiplier 1155 in FIG. 11. In one implementation, the blur luminance component S is chosen as the transformation factor as it is more robust to additive noise than the luminance component Y. For optimized sharpener mechanism 1100, R=R+D, G=G+D, and B=B+D. For these equations, D=DeltaShaper(D/S)*GainAdjuster(S)*S.

Figure 12:
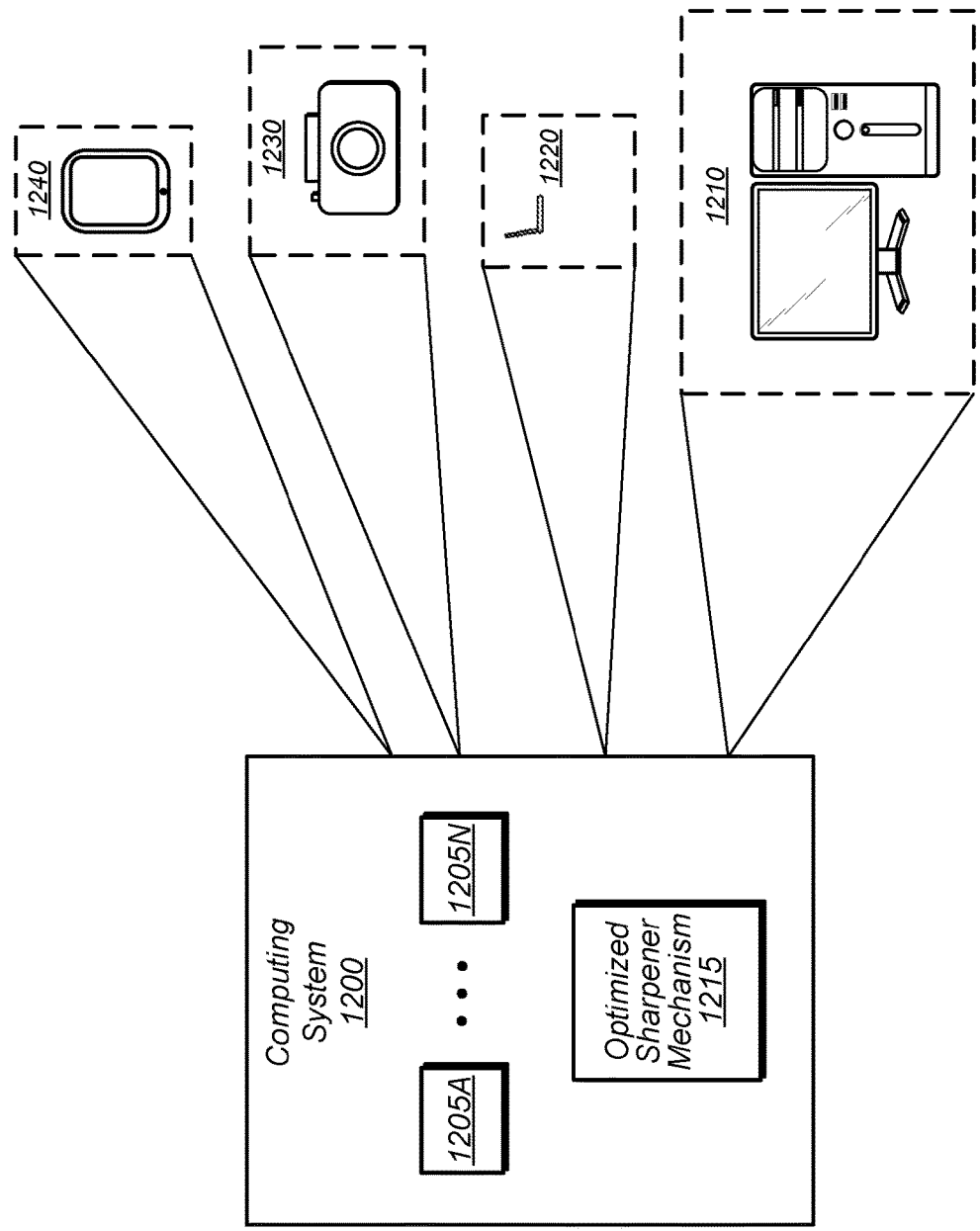
FIG. 12 is a block diagram of one implementation of a computing system.

Turning now to FIG. 12, a block diagram of one implementation of a computing system 1200 is shown. As shown, system 1200 represents chip, circuitry, components, etc., of a desktop computer 1210, laptop computer 1220, camera 1230, mobile device 1240, or otherwise. Other systems, devices, and apparatuses are possible and are contemplated. In the illustrated implementation, the system 1200 includes multiple components 1205A-N and at least one instance of optimized sharpener mechanism 1215. Components 1205A-N are representative of any number and type of components, such as one or more processors, one or more memory devices, one or more peripheral devices, a display, and so on. Optimized sharpener mechanism 1215 includes any of the circuit elements and components presented herein for scaling and sharpening pixel data.

Figure 13:
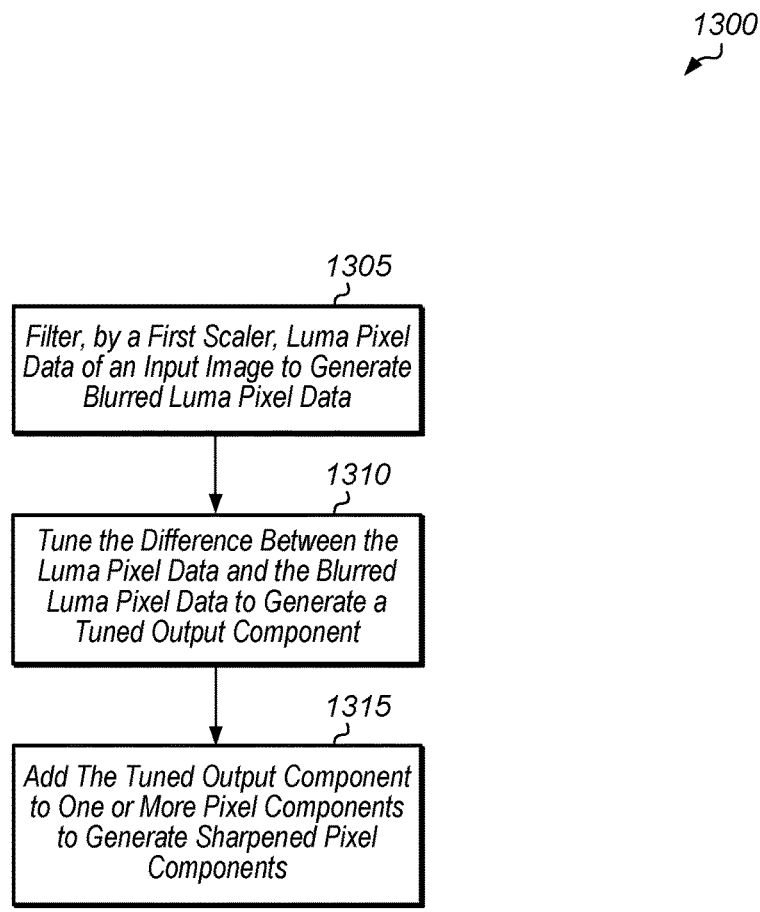
FIG. 13 is a generalized flow diagram illustrating one implementation of a method for performing optimized image sharpening.

Referring now to FIG. 13, one implementation of a method 1300 for performing optimized image sharpening is shown. For purposes of discussion, the steps in this implementation and those of FIG. 14-17 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 1300 (and methods 1400-1700).

A blur filter (e.g., blur filter 420) filters luma pixel data of an input image to generate blurred luma pixel data (block 1305). The difference between the luma pixel data and the blurred luma pixel data is tuned to generate a tuned output (block 1310). The tuned output component is added to one or more pixel components (block 1315). After block 1315, method 1300 ends. The resultant sharpened pixel components can be provided to a display, provided to additional processing stages, and/or stored in a memory device.

Figure 14:
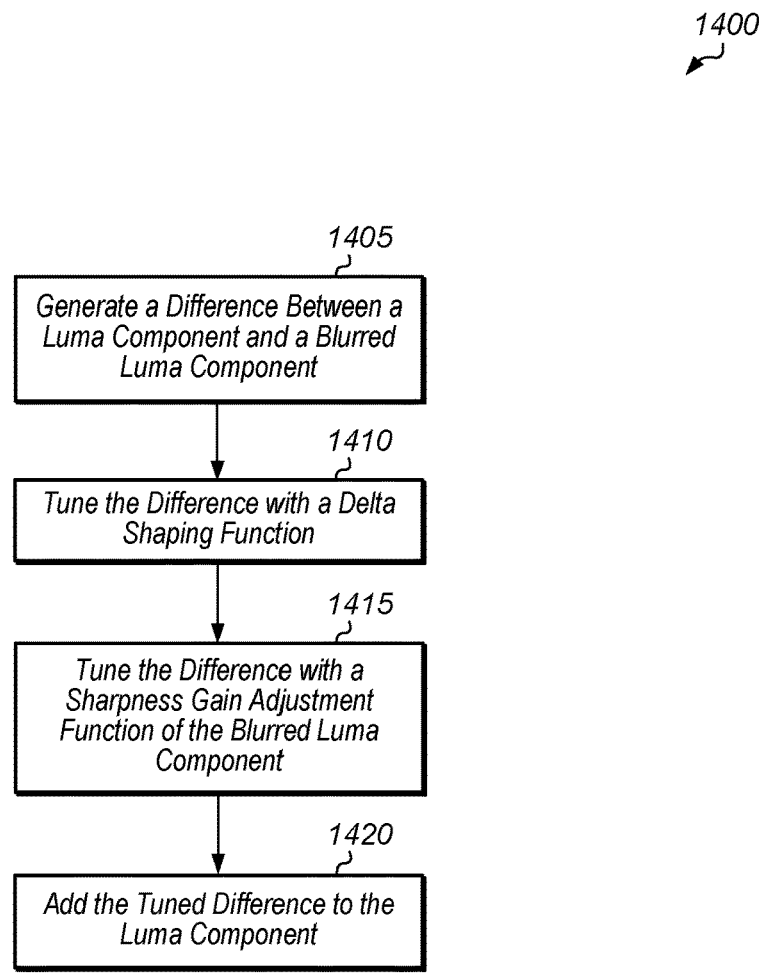
FIG. 14 is a generalized flow diagram illustrating one implementation of a method for sharpening a non-linear gamma encoded image in a Y'C'bC'r format using an optimized sharpener mechanism.

Turning now to FIG. 14, one implementation of a method 1400 for sharpening a non-linear gamma encoded image in a Y'C'bC'r format using an optimized sharpener mechanism is shown. An optimized sharpener mechanism generates a difference between a luma component and a blurred luma component (block 1405). The difference is tuned with a delta shaping function (block 1410). Then, the difference is tuned with a sharpness gain adjustment function of the blurred luma component (block 1415). The tuned difference is added to the luma component (block 1420). After block 1420, method 1400 ends.

Figure 15:
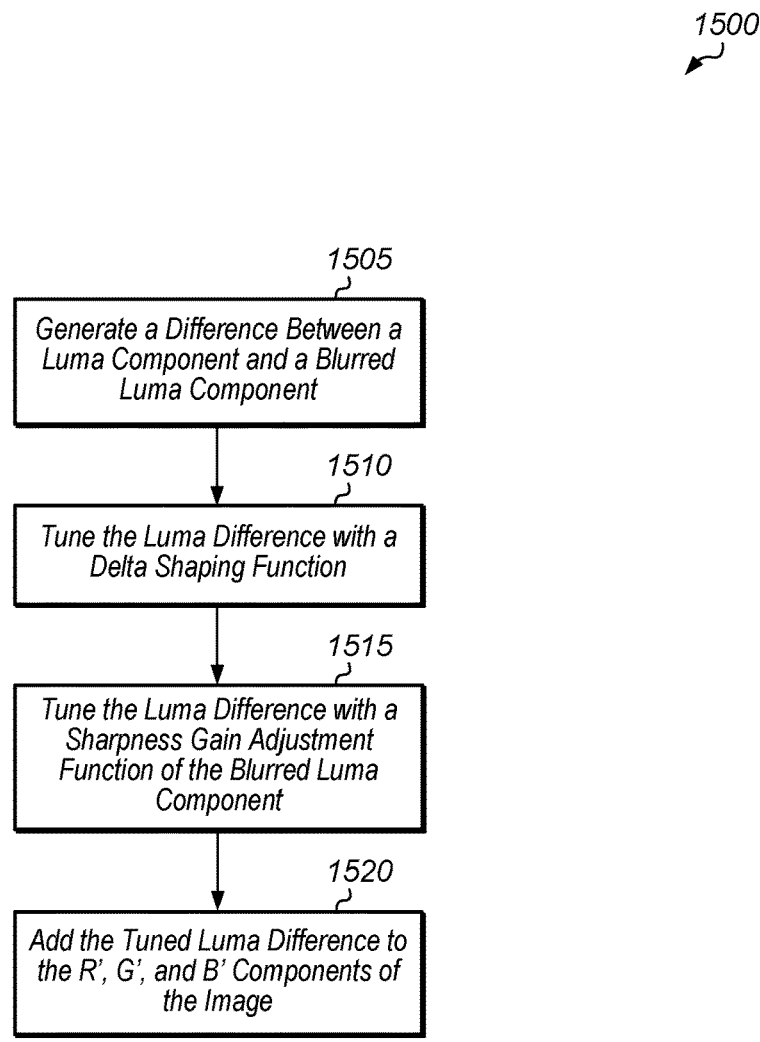
FIG. 15 is a generalized flow diagram illustrating one implementation of a method for sharpening a non-linear gamma or PQ encoded image in a R'G'B' format using an optimized sharpener mechanism.

Referring now to FIG. 15, one implementation of a method 1500 for sharpening a non-linear gamma or PQ encoded image in a R'G'B' format using an optimized sharpener mechanism is shown. An optimized sharpener mechanism generates a difference between a luma component and a blurred luma component (block 1505). The luma difference is tuned with a delta shaping function (e.g., delta shaper 440) (block 1510). Then, the luma difference is tuned with a sharpness gain adjustment function (e.g., gain adjuster 445) of the blurred luma component (block 1515). The tuned luma difference is added to the R', G', and B' components of the image (block 1520). After block 1520, method 1500 ends.

Figure 16:
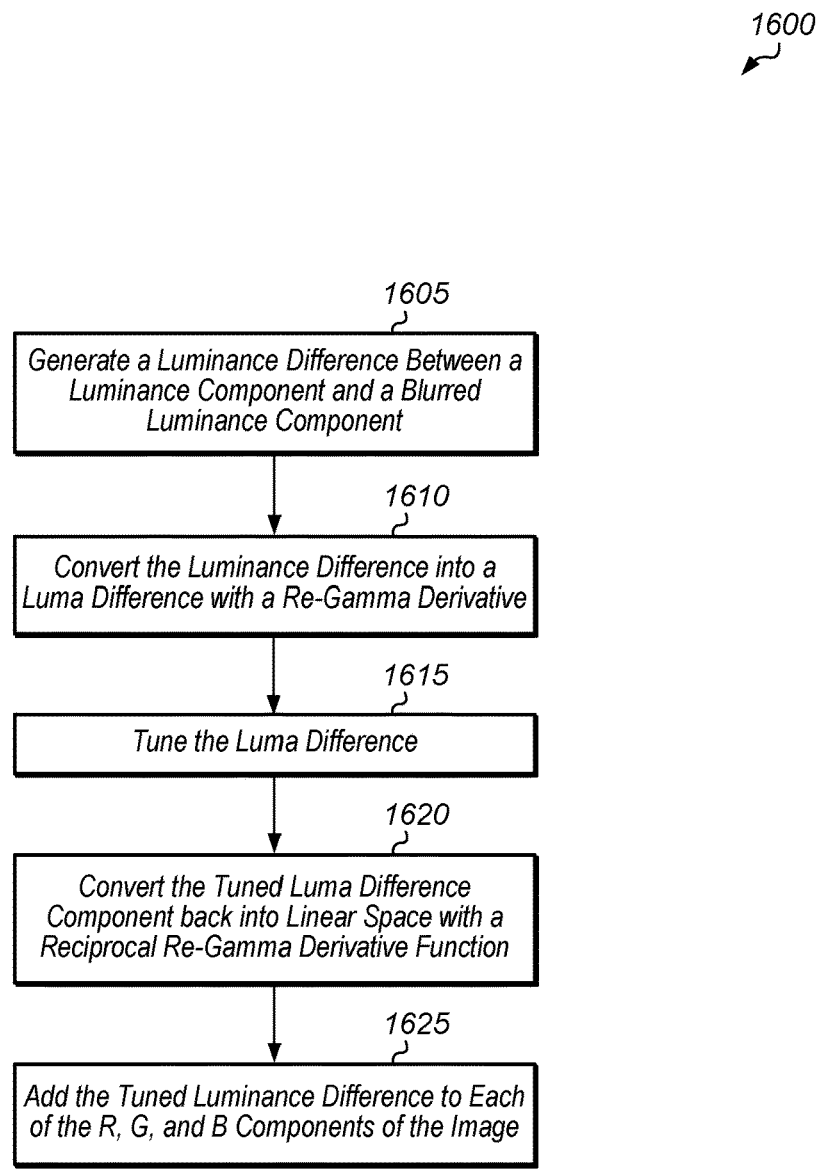
FIG. 16 is a generalized flow diagram illustrating one implementation of a method for sharpening a linear image in a RGB format using an optimized sharpener mechanism.

Turning now to FIG. 16, one implementation of a method 1600 for sharpening a linear image in a RGB format using an optimized sharpener mechanism is shown. An optimized sharpener mechanism generates a luminance difference between a luminance component and a blurred luminance component (block 1605). The optimized sharpener mechanism converts the luminance difference into a luma difference with a re-gamma derivative factor (e.g., RGD block 535) (block 1610). Then, the luma difference is tuned (block 1615). In one implementation, the luma difference is tuned with a delta shaping function (e.g., delta shaper 545) and with a sharpness gain adjustment function of the blurred luminance (e.g., gain adjuster 550).

Next, the tuned luma difference component is converted into the tuned luminance difference component in linear space with a reciprocal re-gamma derivative function (e.g., RRGD block 555) (block 1620). Then, the tuned luminance difference component is added to each of the R, G, and B components of the image (block 1625). After block 1625, method 1600 ends.

Figure 17:
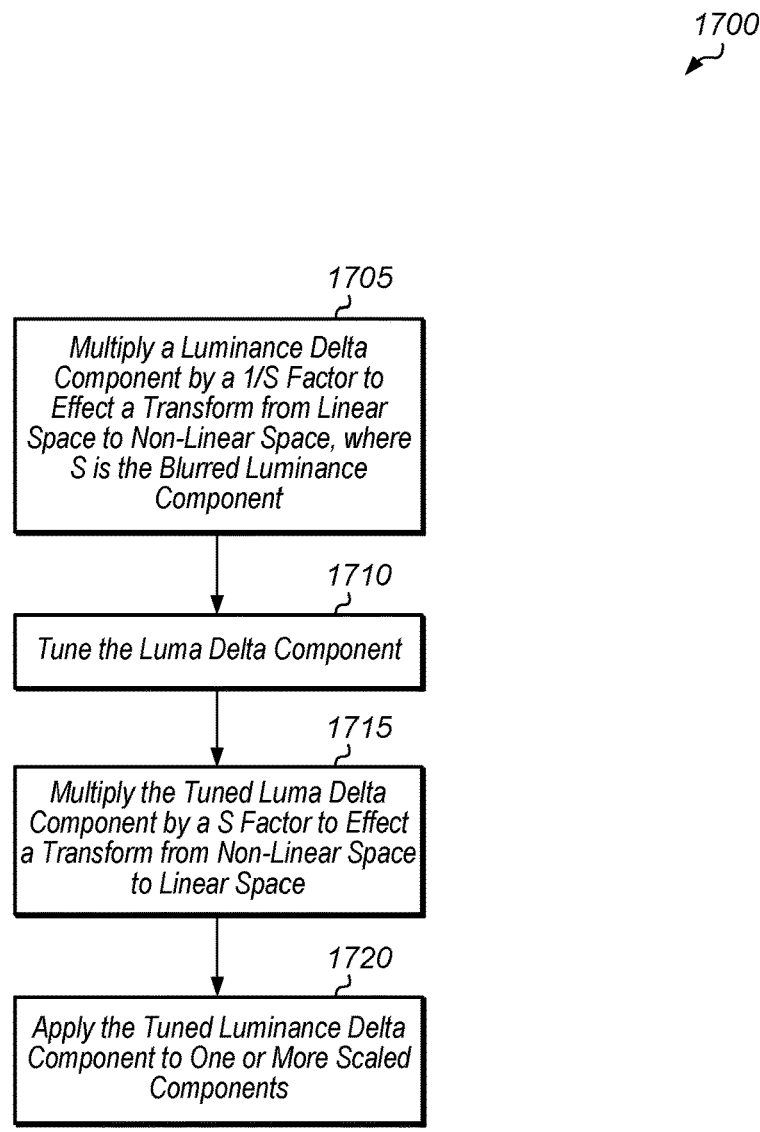
FIG. 17 is a generalized flow diagram illustrating one implementation of a method for performing optimized pre-tuning transformation and post-tuning transformation.

Referring now to FIG. 17, one implementation of a method 1700 for performing optimized pre-tuning transformation and post-tuning transformation is shown. A luminance delta component is multiplied by a 1/S factor to effect a transform from linear space to non-linear space, where S is the blurred luminance component (block 1705). The 1/S factor can also be referred to as the reciprocal of the blurred luminance component. The result of the transform is the luma delta component in non-linear space. Next, the luma delta component is tuned (block 1710). For example, in one implementation, the luma delta component is tuned by a delta shaper function and by a sharpness gain adjustment function of the blur luminance component. Then, the tuned luma delta component is multiplied by an S factor to effect a transform from non-linear space to linear space (block 1715). The result of the transform is the tuned luminance delta component in linear space. Next, the tuned luminance delta component is applied to one or more components (block 1720). After block 1720, method 1700 ends.

Figure 18:
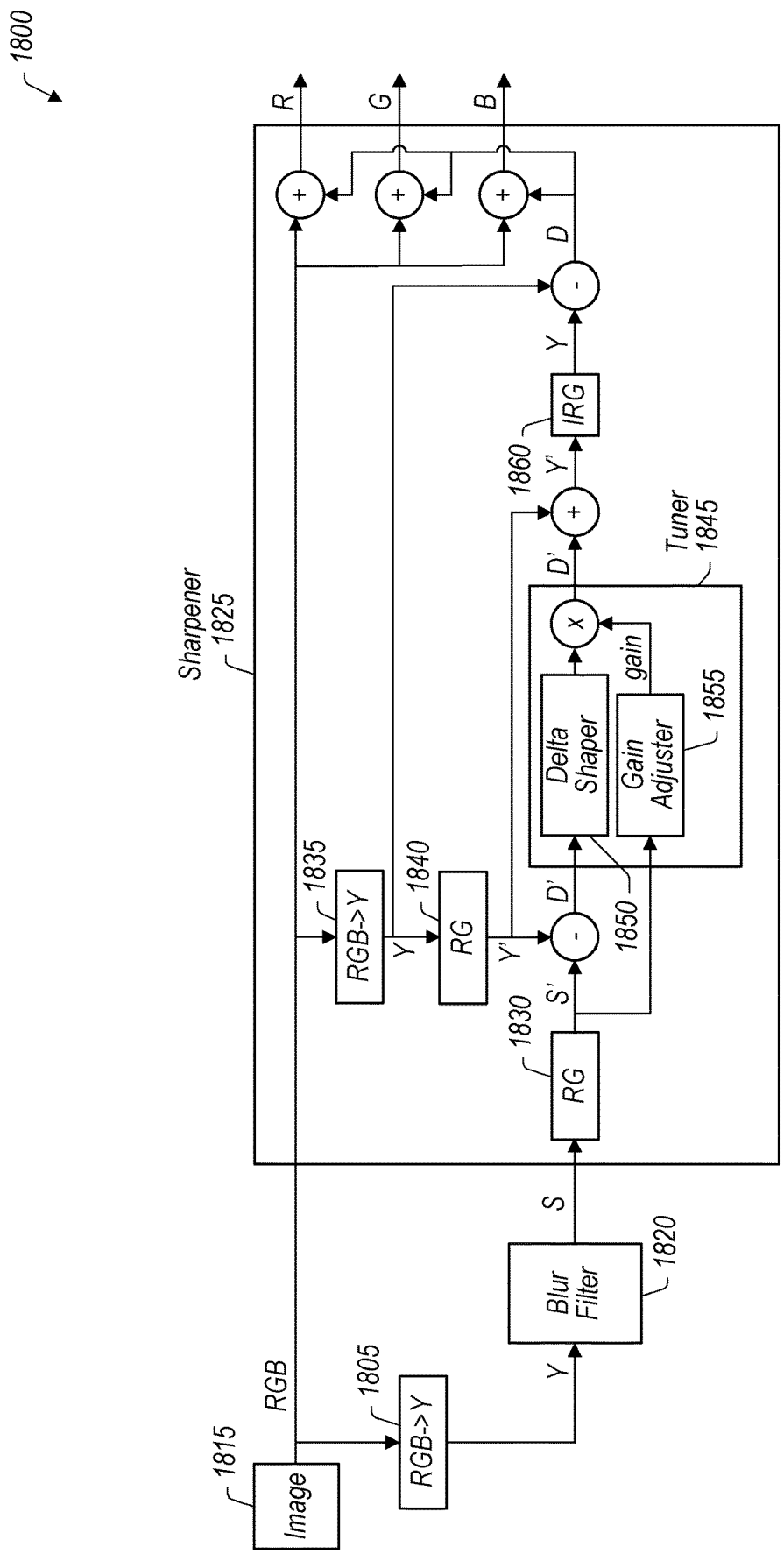
FIG. 18 is a block diagram of one implementation of an optimized sharpener mechanism for linear RGB pixel data.
Figure 19:
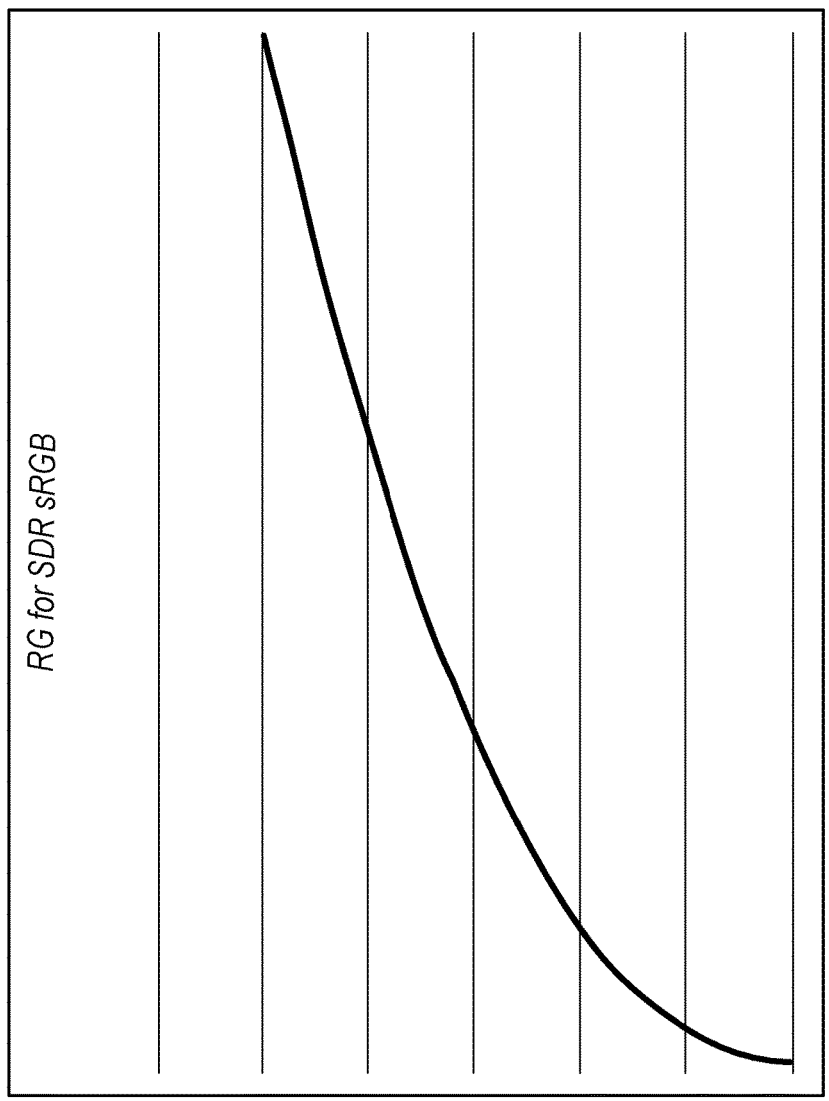
FIG. 19 illustrates a shape of a re-gamma curve for a SDR sRGB encoded image.
Figure 20:
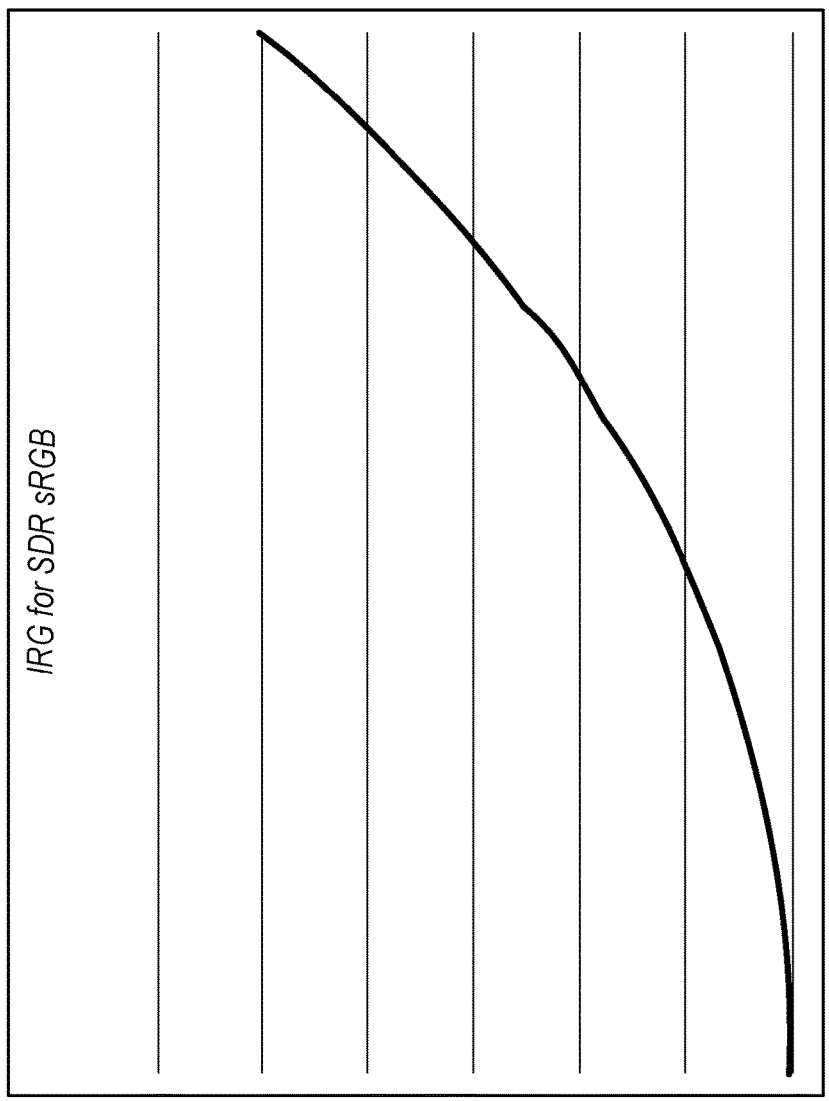
FIG. 20 illustrates a shape of an inverse re-gamma curve for a SDR sRGB encoded image.
Figure 21:
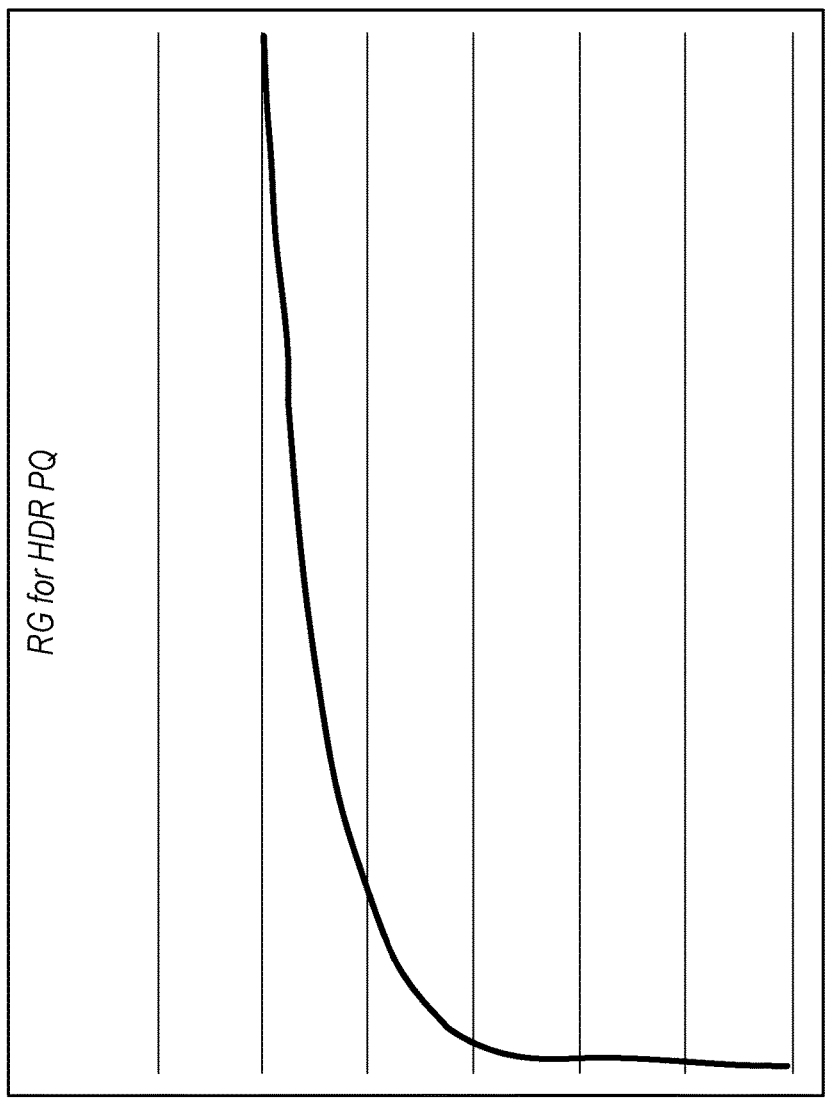
FIG. 21 illustrates a shape of a re-gamma curve for a HDR PQ encoded image.
Figure 22:
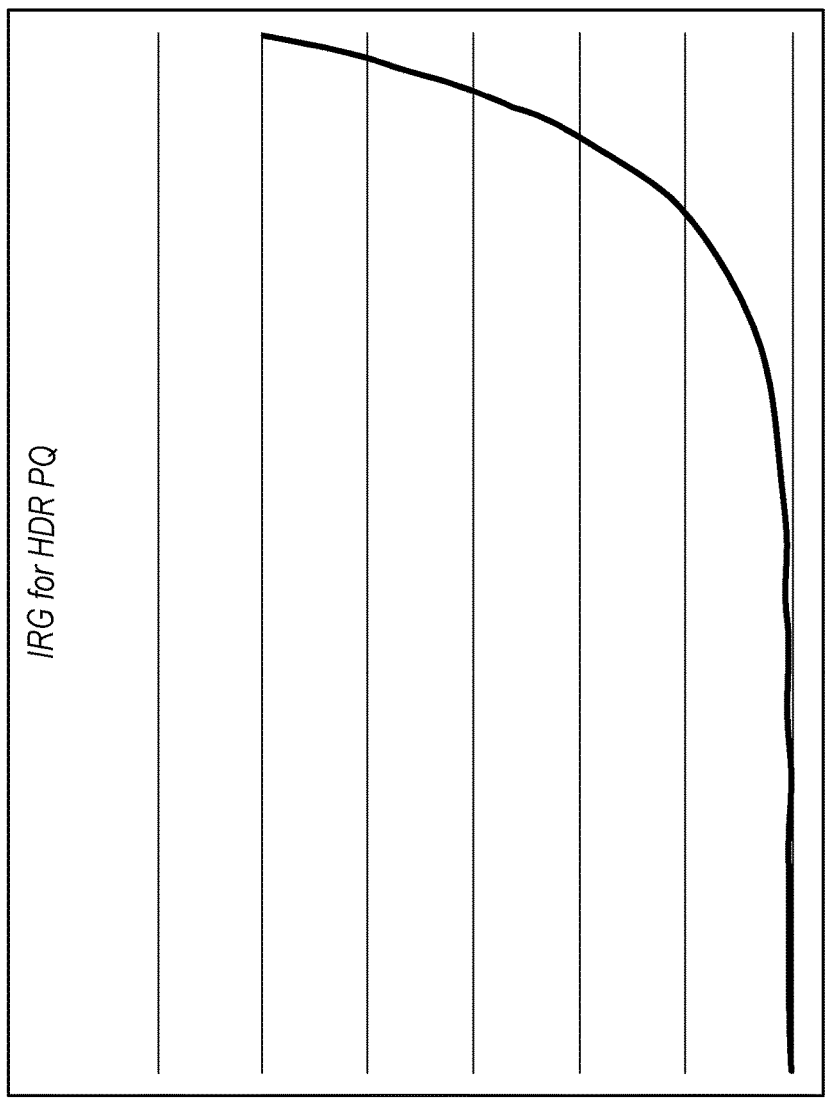
FIG. 22 illustrates a shape of an inverse re-gamma curve for a HDR PQ encoded image.

Turning now to FIG. 18, a block diagram of one implementation of an optimized sharpener mechanism 1800 for linear RGB pixel data is shown. As shown in FIG. 18, optimized sharpener mechanism 1800 includes blur filter 1820, RGB-to-Y converters 1805 and 1835, sharpener 1825, tuner 1845, delta shaper 1850, and gain adjuster 1855. Optimized sharpener mechanism 1800 also includes re-gamma (RG) functions 1830 and 1840 which convert the blurred luminance component and the luminance component, respectively, from linear to non-linear format. Curve 1900 of FIG. 19 is one example of a re-gamma curve for a SDR sRGB encoded image and PQ curve 2100 of FIG. 21 is one example of a re-gamma curve for a HDR PQ encoded image. Inverse re-gamma (IRG) function 1860 converts the sharpened luma component from non-linear to linear format. One example of an inverse re-gamma curve for a SDR sRGB encoded image is shown as curve 2000 of FIG. 20 and one example of an inverse PQ curve for HDR PQ encoded image is shown as curve 2200 of FIG. 22. Finally, a difference between the sharpened luminance component and the source luminance component is added to red, green, and blue source pixel components in the linear format.

Figure 23:
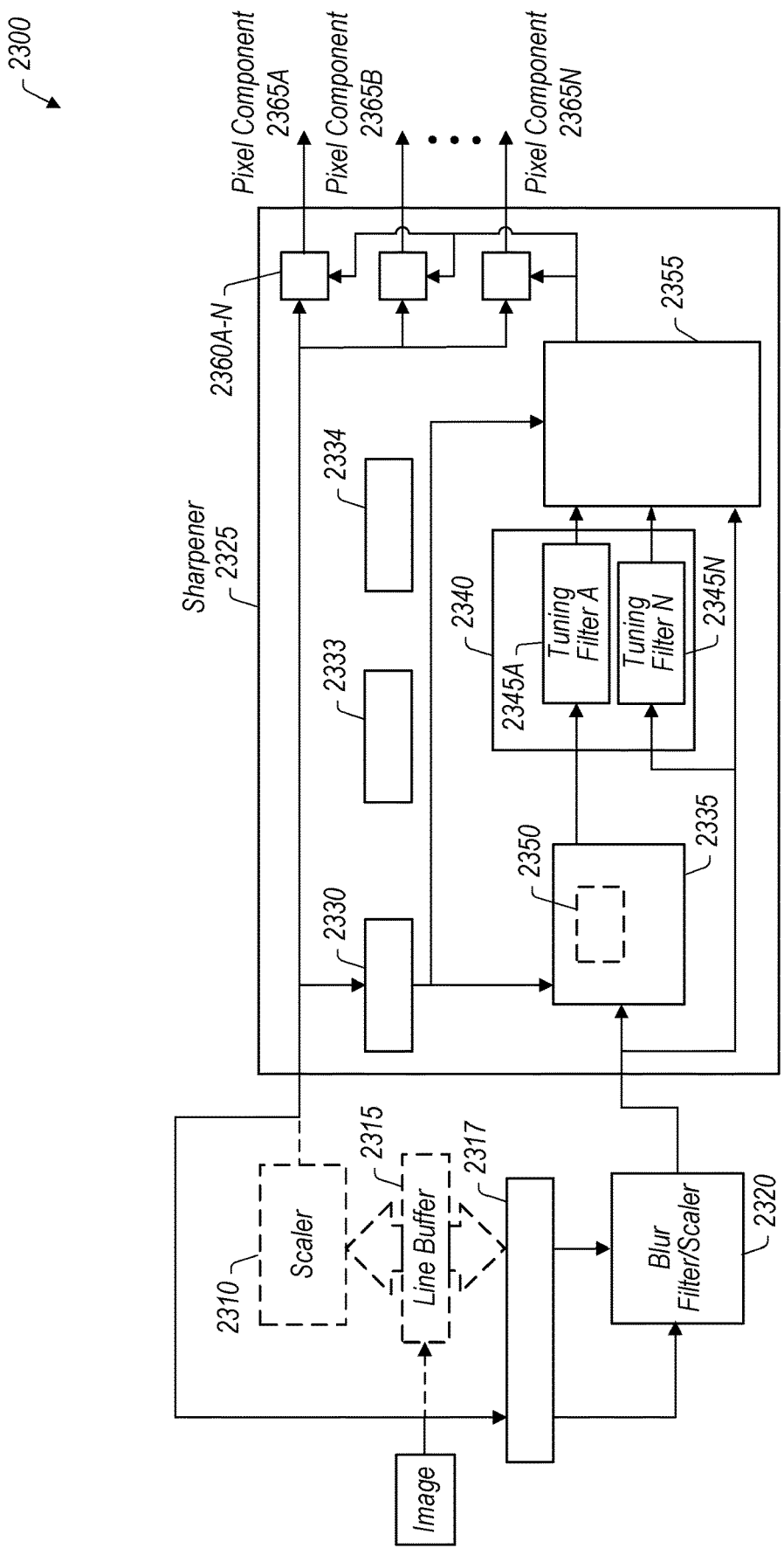
FIG. 23 is a block diagram of one implementation of a sharpener mechanism.

Referring now to FIG. 23, a block diagram of one implementation of a sharpener mechanism 2300 is shown. Sharpener mechanism 2300 includes at least optional scaler unit 2310, optional line buffer 2315, conversion unit 2317, blur filter/scaler unit 2320, and sharpener 2325. Sharpener mechanism 2300 may also include any number of other components which are not shown to avoid obscuring the figure. Sharpener mechanism 2300 is able to sharpen source pixel data in a variety of different formats, including linear and non-linear formats. Sharpener mechanism 2300 is programmable to implement any of the previously described optimized sharpener mechanisms, with sharpener mechanism 2300 reprogrammable on an image-by-image or frame-by-frame basis, or on a portion-by-portion basis for portions of images/frames. In other words, sharpener mechanism 2300 can process a first frame (or a portion thereof) acting as a first type of optimized sharpener mechanism, sharpener mechanism 2300 can process a second frame acting as a second type of optimized sharpener mechanism, sharpener mechanism 2300 can process a third frame acting as a third type of optimized sharpener mechanism, and so on. However, sharpener mechanism 2300 does not need to switch modes after each frame, but rather, can process any number of frames in a first mode, process any number of frames in a second mode, and so on.

In one implementation, sharpener unit 2300 is programmed by software to sharpen any of various types of images or video frames, with the type of image data changing over any interval of time. For example, software can program sharpener unit 2300 to sharpen a first image in a linear format. After sharpening the first image, software can program sharpener unit 2300 to sharpen a second image in a non-linear format. Generally speaking, sharpener unit 2300 is able to process multiple different types of formatted input data, through explicit programming from software, or through the detection of the specific format type by optional format detection unit 2350.

Optional scaler unit 2310 is configured to scale source pixel data to upscale, downscale, or pass-through the source pixel data for 1:1 scaling. Optional line buffer 2315 is configured to store source pixel data for access by both optional scaler unit 2310 and blur filter/scaler unit 2320. In implementations where optional scaler unit 2310 is omitted, optional line buffer 2315 can either be omitted, or optional line buffer 2315 can be included within sharpener 2300 and permit accesses by blur filter/scaler unit 2320. Blur filter/scaler unit 2320 can perform many different functions, with these functions dependent on the specific implementation.

Blur filter/scaler unit 2320 is able to scale source pixel data, blur source pixel data, scale and blur source pixel data, or blur, scale, and perform one or more other operations on source pixel data, depending on the implementation. In one implementation, blur filter/scaler unit 2320 retrieves the source pixel data from optional line buffer 2315. In another implementation, blur filter/scaler unit 2320 retrieves or receives the source pixel data from memory. In other implementations, blur filter/scaler unit 2320 retrieves or receives the source pixel data from other sources.

In one implementation, the operation of blur filter/scaler unit 2320 and the other components of sharpener mechanism 2300 is determined based on the specific mode stored in mode unit 2334. Depending on the implementation, mode unit 2334 is programmed by software, a control unit, a device driver, a processor, or by another component. Mode unit 2334 can include a mode register or constructed of other types of memory/storage elements. The specific modes indicated by mode unit 2334 can include modes that are selected based on the format of the source pixel data. For example, there can be a first mode for linear format source pixel data and a second mode for non-linear format source pixel data. In some cases, the format of source pixel data is specified or indicated by one or more first portion of bits of a particular mode setting. For example, in one implementation, a first bit indicates linear or non-linear format, a second bit indicates RGB or YCbCr format, and so on. One or more other bits of the mode setting can determine whether mode unit 2334 is in blurring without scaling sharpening mode, blurring and scaling sharpening mode, scaling without blurring sharpening mode, and/or other sharpening modes.

In other implementations, each specific format has a separate encoding. For example, in one implementation, sharpening of linear RGB data has a first encoding, sharpening of non-linear R'G'B' data has a second encoding, non-linear Y'C'bC'r has a third encoding, and so on. The type of sharpening that is performed can be also be encoded into separate modes in mode unit 2334 for each different type of sharpening being performed. For example, a first set of filter coefficients for tuning filters 2345A-N in tuner 2340 can be used for a first frame, a second set of filter coefficients for tuning filters 2345A-N in tuner 2340 can be used for a second frame, a third set of filter coefficients for tuning filters 2345A-N in tuner 2340 can be used for a third frame, and so on. The tuning coefficients can change independently of the format of the source pixel data. In other words, the tuning coefficients can change for a first format, or the tuning coefficients can remain the same while the source pixel data changes from a first format to a second format, from a second format to a third format, and so on.

In one implementation, control unit 2333 manages the operation of the components of sharpener 2300 to match the specific mode indicated by mode unit 2334. For example, based on the operating mode indicated by mode unit 2334, control unit 2333 programs blur filter/scaler unit 2320, conversion units 2317 and 2330, difference unit 2335, tuner 2340, conversion unit 2355, and combination units 2360A-N to operate in accordance with the operating mode. For example, if the source pixel data is in RGB format, control unit 2333 programs conversion units 2317 and 2330 to generate luminance/luma components from the RGB source pixel data. Depending on the implementation, difference unit 2335 can include circuitry to apply a Re-Gamma Derivative factor (e.g., RGD block 535 of FIG. 5, RGD block 1035 of FIG. 10), perform a subtraction/difference operation between a luminance/luma component and a blurred luminance/luma component, perform a divide operation (e.g., divider component 1135 of FIG. 11), apply a re-gamma (RG) function (e.g., RG function 1830 of FIG. 18), and/or perform other operations. Also, depending on the implementation, conversion unit 2355 can include circuitry to pass components through unchanged (i.e., pass-through circuitry), apply a Reciprocal Re-Gamma Derivative factor (e.g., RRGD block 555 of FIG. 5, RRGD block 1050 of FIG. 10), perform a subtraction/difference operation between a luminance/luma component and a blurred luminance/luma component, perform a multiply operation (e.g., multiplier 1155 of FIG. 11), apply an inverse re-gamma (IRG) function (e.g., IRG function 1860 of FIG. 18), and/or perform other operations. Control unit 2333 is implemented using any suitable combination of circuitry and/or executable program instructions.

After the various input pixel components have been tuned by tuner 2340, the tuned pixel components are combined with the original or scaled pixel components by conversion unit 2355 and combination units 2360A-N to create the output pixel components. In one implementation, combination units 2360A-N perform addition operations. In other implementations, other types of operations can be performed to combine the tuned outputs with the original or scaled pixel components. Any number of output pixel components 2365A-N can be generated, with the number varying from implementation to implementation. For example, in one implementation, there are three R, G, and B pixel components (or R', G', and B' pixel components). In another implementation, there are four pixel components, with three R, G, and B pixel components along with an alpha (or transparency) component. Other implementations can have other numbers and/or types of output pixel components 2365A-N.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. The implementations are applied for up-scaled, down-scaled, and non-scaled images. Numerous variations and modifications will become apparent to those skilled in the art once the above disclosure is fully appreciated. It is intended that the following claims be interpreted to embrace all such variations and modifications.

What is claimed is:

1. An apparatus comprising:
  a blur filtering circuit configured to generate blurred pixel data from source pixel data, wherein the source pixel data is represented in either a linear format or a non-linear format; and
  a sharpener circuit configured to perform a sharpening operation on pixel data received in either the linear format or the non-linear format, wherein to perform the sharpening operation the sharpener circuit is configured to:
    convert at least a portion of the source pixel data from the linear format to the non-linear format, responsive to the source pixel data being in the linear format; and
    combine the source pixel data and the blurred pixel data to generate sharpened output pixel data to be displayed on a display.

2. The apparatus as recited in claim 1, wherein the sharpener circuit is further configured to:
tune a difference between:
a luminance component and a blur luminance component to generate a tuned luminance difference component when the source pixel data is in the linear format; and
a luma component and a blur luma component to generate a tuned luma difference component when the source pixel data is in the non-linear format.

3. The apparatus as recited in claim 1, wherein the source pixel data is in a non-linear gamma encoded Y'C'bC'r format, and wherein the sharpener circuit is configured to:
generate a luma difference component as a difference between a luma component and a blurred luma component;
tune the luma difference component to generate a tuned luma difference component; and
add the tuned luma difference component to the luma component.

4. The apparatus as recited in claim 1, wherein the source pixel data is in a linear format, and wherein the sharpener circuit is configured to:
convert a luminance difference component in the linear format into a luma difference component in the non-linear format;
convert a tuned luma difference component in the non-linear format into a tuned luminance difference component in the linear format; and
add the tuned luminance difference component in the linear format to red, green, and blue pixel components.

5. The apparatus as recited in claim 1, wherein the source pixel data is in a linear RGB format, and wherein the sharpener circuit is configured to:
convert, with a re-gamma function, a luminance component in the linear format to a luma component in the non-linear format;
convert, with the re-gamma function, a blurred luminance component in the linear format to a blurred luma component in the non-linear format; and
calculate a luma difference component as a difference between the luma component and the blurred luma component.

6. The apparatus as recited in claim 2, wherein the sharpener circuit is further configured to add the tuned luminance difference component to the source pixel data to generate the sharpened output pixel data or add the tuned luma difference component to the source pixel data to generate the sharpened output pixel data.

7. A method comprising:
accessing, by a blur filtering circuit, source pixel data to generate blurred pixel data, wherein the source pixel data is represented in either a linear format or a non-linear format; and
performing a sharpening operation on the source pixel data, wherein performing the sharpening operation comprises:
converting at least a portion of the source pixel data from the linear format to the non-linear format, responsive to the source pixel data being in the linear format; and
combining, by a sharpener circuit, the source pixel data and the blurred pixel data to generate sharpened output pixel data to be displayed on a display.

8. The method as recited in claim 7, wherein the source pixel data is represented in either a linear format or a non-linear format, wherein the method further comprising:
tuning, by the sharpener circuit, a difference between:
a luminance component and a blur luminance component to generate a tuned luminance difference component when the source pixel data is in the linear format;
a luma component and a blur luma component to generate a tuned luma difference component when the source pixel data is in the non-linear format; and
adding, by the sharpener circuit, the tuned luminance difference component to the source pixel data to generate the sharpened output pixel data or adding the tuned luma difference component to the source pixel data to generate the sharpened output pixel data.

9. The method as recited in claim 7, wherein the source pixel data is in a non-linear gamma encoded Y'C'bC'r format, and wherein the method further comprising:
generating a luma difference component of a difference between a luma component and a blurred luma component;
tuning the luma difference component to generate a tuned luma difference component; and
adding the tuned luma difference component to the luma component.

10. The method as recited in claim 7, wherein the source pixel data is in a linear format, and wherein the method further comprising:
converting, a luminance difference component in the linear format into a luma difference component in the non-linear format;
converting, a tuned version of the luma difference component to a tuned luminance difference component in the linear format; and
adding the tuned luminance difference component in the linear format to red, green, and blue pixel components.

11. The method as recited in claim 7, further comprising:
converting a luminance difference component in the linear format into a luma difference component in the non-linear format by dividing the luminance difference component by a blurred luminance component.

12. The method as recited in claim 7, wherein the source pixel data is in a linear RGB format, and wherein the method further comprising:
converting, with a re-gamma function, luminance component in the linear format to luma component in the non-linear format;
converting, with the re-gamma function, blurred luminance component in the linear format to blurred luma component in the non-linear format; and
calculating a luma difference component as a difference between the luma component and the blurred luma component.

13. The method as recited in claim 12, further comprising:
tuning the luma difference component with a delta shaping function and with a sharpening gain adjustment function of the blurred luma component;
calculating a sharpened luma component in the non-linear format by adding the tuned luma difference component to the luma component;
converting, with an inverse gamma function, the sharpened luma component in the non-linear format to a sharpened luminance component in the linear format;
calculating a luminance difference component as a difference between the sharpened luminance component and the luminance component; and
adding the luminance difference component in the linear format to red, green, and blue pixel components.

14. A system comprising:
circuitry comprising:
  conversion circuitry configured to:
    receive source pixel data represented in either a linear format or a non-linear format; and
    convert the source pixel data to a non-linear format, responsive to the source pixel data being in a linear format;
  a blur filtering circuit configured to generate blurred pixel data from the source pixel data; and
  a sharpener circuit configured to combine the source pixel data and the blurred pixel data to generate sharpened output pixel data to be displayed on a display; and
  a mode circuit configured to cause the sharpener circuit to operate on source pixel data that has not been converted by the conversion circuitry, responsive to the source pixel data being received in a non-linear format.

15. The system as recited in claim 14, wherein the source pixel data is represented in either a linear format or a non-linear format, and wherein the sharpener circuit is further configured to:
  tune a difference between:
    a luminance component and a blur luminance component to generate a tuned luminance difference component when the source pixel data is in the linear format; and
    a luma component and a blur luma component to generate a tuned luma difference component when the source pixel data is in the non-linear format.

16. The system as recited in claim 14, wherein the source pixel data is in a non-linear gamma encoded Y'C'bC'r format, and wherein the sharpener circuit is configured to:
  generate a luma difference component as a difference between a luma component and a blurred luma component;
  tune the luma difference component to generate a tuned luma difference component; and
  add the tuned luma difference component to the luma component.

17. The system as recited in claim 14, wherein the source pixel data is in a linear RGB format, and wherein the sharpener circuit is configured to:
  calculate a luminance difference component as a difference between a luminance component and a blurred luminance component;
  convert, with a re-gamma derivative function, the luminance difference component into a luma difference component in the non-linear format;
  tune the luma difference component with a delta shaping function and with a sharpening gain adjustment function of the blurred luminance component;
  convert, with a reciprocal re-gamma derivative function, a tuned version of the luma difference component into a tuned luminance difference component in the linear format; and
  add the tuned luminance difference component in the linear format to red, green, and blue pixel components.

18. The system as recited in claim 14, wherein the source pixel data is in a linear RGB format, and wherein the sharpener circuit is configured to:
  calculate a luminance difference component as a difference between a luminance component and a blurred luminance component, wherein the luminance component and the blurred luminance component are in the linear format;
  convert the luminance difference component into a luma difference component in the non-linear format by dividing the luminance difference component by the blurred luminance component;
  tune the luma difference component with a delta shaping function and with a sharpening gain adjustment function of the blurred luminance component;
  convert the tuned luma difference component into a tuned luminance difference component in a linear format by multiplying the luminance difference by the blurred luminance component; and
  add the tuned luminance difference component in the linear format to red, green, and blue pixel components.

* * * * *